United States Patent
Ueda et al.

(10) Patent No.: US 11,339,695 B2
(45) Date of Patent: May 24, 2022

(54) EXHAUST PURIFICATION SYSTEM OF INTERNAL COMBUSTION ENGINE

(71) Applicant: TOYOTA JIDOSHA KABUSHIKI KAISHA, Toyota (JP)

(72) Inventors: Hiroyoshi Ueda, Chigasaki (JP); Kazuhiro Umemoto, Ebina (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/098,628

(22) Filed: Nov. 16, 2020

(65) Prior Publication Data

US 2021/0180491 A1 Jun. 17, 2021

(30) Foreign Application Priority Data

Dec. 16, 2019 (JP) .............................. JP2019-226750

(51) Int. Cl.
*F01N 3/00* (2006.01)
*F01N 3/08* (2006.01)
*F01N 3/20* (2006.01)

(52) U.S. Cl.
CPC ......... *F01N 3/0814* (2013.01); *F01N 3/0842* (2013.01); *F01N 3/0864* (2013.01); *F01N 3/20* (2013.01)

(58) Field of Classification Search
CPC .... F01N 3/0814; F01N 3/0842; F01N 3/0864; F01N 3/20; F01N 2430/06;

(Continued)

(56) References Cited

U.S. PATENT DOCUMENTS

| 2010/0319327 A1* | 12/2010 | Sano ................. B60W 10/06 60/286 |
| 2011/0203551 A1* | 8/2011 | Russ .................. F02D 41/0007 123/406.45 |

(Continued)

FOREIGN PATENT DOCUMENTS

| JP | 2018-009535 A | 1/2018 |
| JP | 2020-41431 A | 3/2020 |

OTHER PUBLICATIONS

Carillo et al., Regenerative trapping: How Pd improves the durability of Pt diesel oxidation catalysts, Jul. 2017, Applied Catalysis B: Environmental, p. 581-590.*

*Primary Examiner* — Matthew T Largi
(74) *Attorney, Agent, or Firm* — Oblon, McClelland, Maier & Neustadt, L.L.P.

(57) ABSTRACT

The exhaust purification system of an internal combustion engine comprises a catalyst 20 arranged in an exhaust passage and able to store oxygen, and an air-fuel ratio control device configured to control an air-fuel ratio of inflowing exhaust gas flowing into the catalyst. The catalyst has a precious metal and the precious metal has a property of a vapor pressure at a predetermined temperature becoming lower when oxidized. If a temperature of the catalyst is equal to or greater than a threshold temperature or if predicting a rise in temperature of the catalyst, the air-fuel ratio control device is configured to make the air-fuel ratio of the inflowing exhaust gas leaner than a stoichiometric air-fuel ratio so that an oxygen storage amount of the catalyst becomes equal to or greater than an upper side reference amount.

11 Claims, 20 Drawing Sheets

(58) Field of Classification Search
CPC ...... F01N 2900/1624; F01N 3/28; F01N 3/30; F01N 3/36
See application file for complete search history.

(56) References Cited

U.S. PATENT DOCUMENTS

| | | |
|---|---|---|
| 2015/0322878 A1* | 11/2015 | Okazaki .............. F02D 41/0295 60/285 |
| 2017/0101953 A1* | 4/2017 | Takada .................. F01N 3/0864 |
| 2018/0017001 A1 | 1/2018 | Ito et al. |
| 2018/0283304 A1* | 10/2018 | Yoda ................... F02D 41/1445 |
| 2019/0195115 A1* | 6/2019 | Paukner ................. F01N 3/035 |
| 2020/0080458 A1 | 3/2020 | Umemoto |
| 2020/0095915 A1* | 3/2020 | Guo ......................... B01J 23/10 |
| 2020/0182116 A1* | 6/2020 | Umezawa ........... F02D 41/1439 |
| 2021/0180491 A1* | 6/2021 | Ueda .................... F01N 3/0842 |

\* cited by examiner

FIG. 1
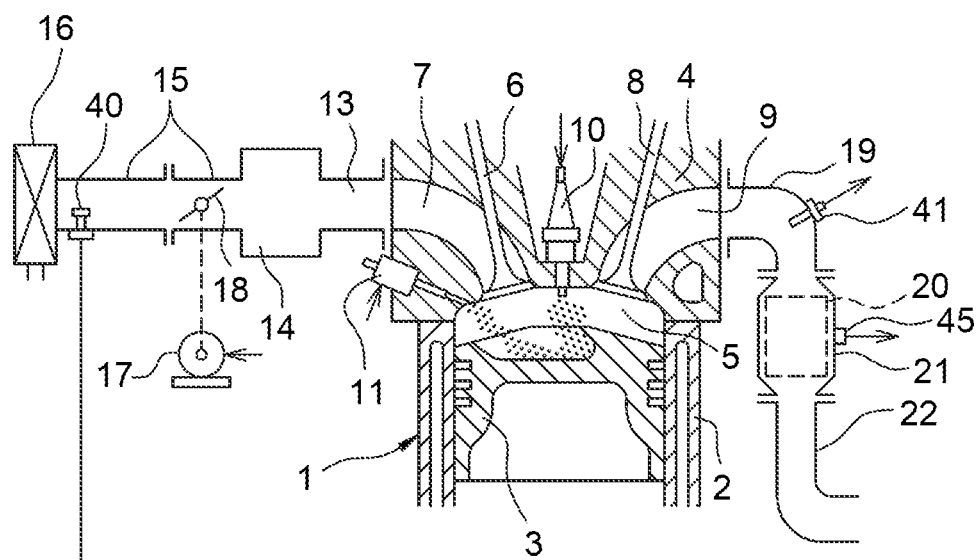
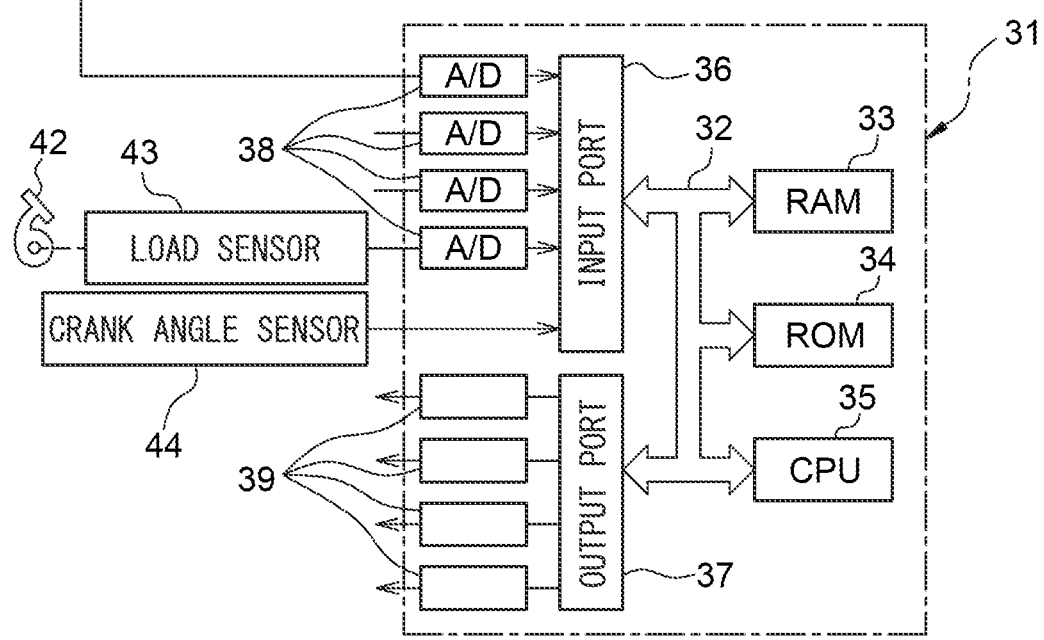

FIG. 6
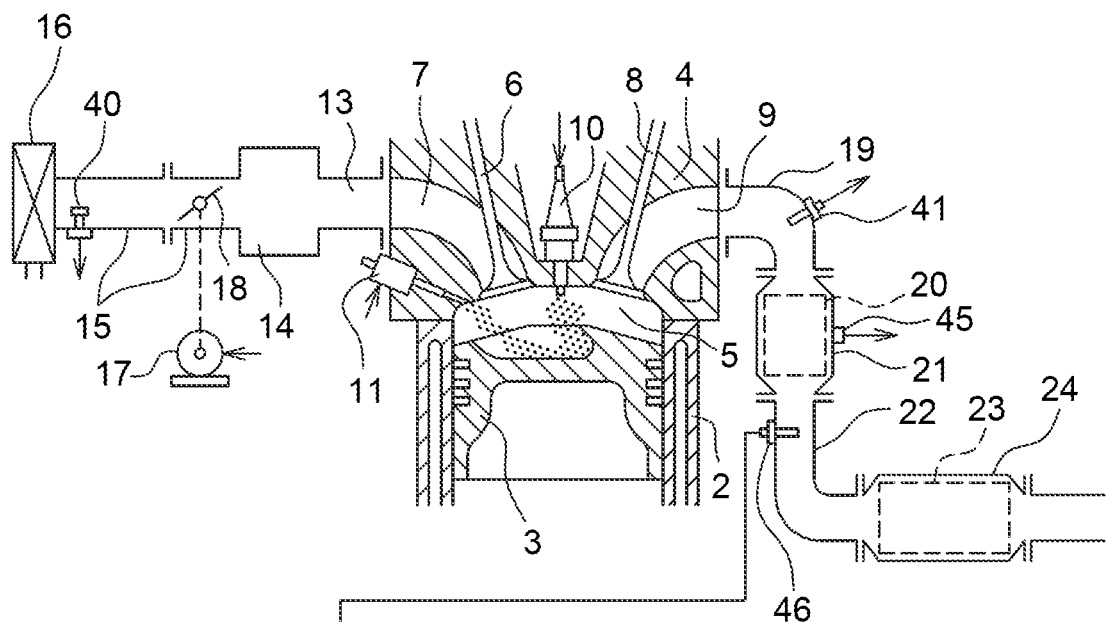
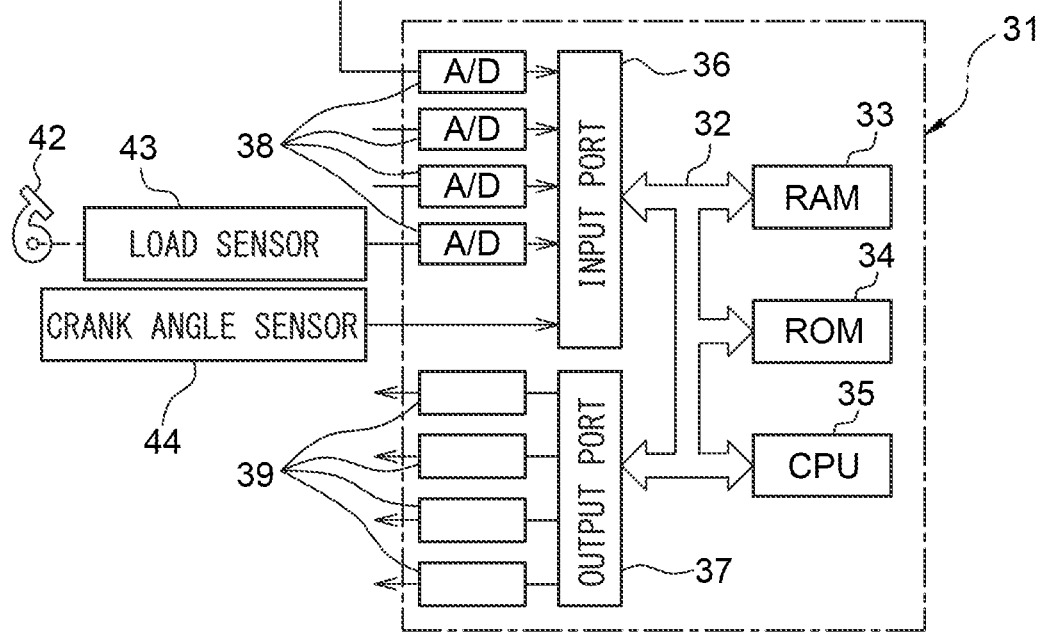

EXHAUST PURIFICATION SYSTEM OF INTERNAL COMBUSTION ENGINE

FIELD

The present invention relates to an exhaust purification system of an internal combustion engine.

BACKGROUND

It has been known in the past to arrange a catalyst in an exhaust passage of an internal combustion engine and remove the harmful substances of the exhaust gas (HC, $NO_X$, etc.) at the catalyst (for example, PTL 1). However, if the catalyst is supplied with oxygen in the state of a high temperature of the catalyst, oxidation of the precious metal is liable to cause the catalyst to deteriorate.

As opposed to this, in the internal combustion engine described in PTL 1, if the temperature of the catalyst is equal to or greater than a predetermined temperature when the condition stands for performance of fuel cut control stopping fuel injection by a fuel injector, when performing the fuel cut control, the control for making the EGR gas instead of fresh air flow into the catalyst is performed. By doing this, it is considered possible to prevent the inflow of oxygen to the catalyst and keep the catalyst from deteriorating.

CITATIONS LIST

Patent Literature

[PTL 1] Japanese Unexamined Patent Publication No. 2018-009535

SUMMARY

Technical Problem

However, to perform the above control, a configuration for causing the EGR gas to be recirculated from an exhaust passage to an intake passage becomes essential and it is necessary to delay the timing of start of the fuel cut control so as to make the EGR gas recirculate. Further, even at a timing other than the fuel cut control such as when stopping the internal combustion engine, oxygen is liable to flow into the catalyst. In addition, depending on the properties of the precious metal of the catalyst, when the temperature of the catalyst is high, the catalyst will sometimes deteriorate due to exhaust gas of an air-fuel ratio richer than the stoichiometric air-fuel ratio flowing into the catalyst.

Therefore, in consideration of the above problem, the object of the present invention is to provide an exhaust purification system of an internal combustion engine able to effectively keep a catalyst from deteriorating.

Solution to Problem

The summary of the present disclosure is as follows.

(1) An exhaust purification system of an internal combustion engine comprising: a catalyst arranged in an exhaust passage and able to store oxygen; and an air-fuel ratio control device configured to control an air-fuel ratio of inflowing exhaust gas flowing into the catalyst, wherein the catalyst has a precious metal and the precious metal has a property of a vapor pressure at a predetermined temperature becoming lower when oxidized, and if a temperature of the catalyst is equal to or greater than a threshold temperature or if predicting a rise in temperature of the catalyst, the air-fuel ratio control device is configured to make the air-fuel ratio of the inflowing exhaust gas leaner than a stoichiometric air-fuel ratio so that an oxygen storage amount of the catalyst becomes equal to or greater than an upper side reference amount.

(2) The exhaust purification system of an internal combustion engine described in above (1), further comprising an $NO_X$ purification device arranged in the exhaust passage at a downstream side of the catalyst in a direction of exhaust flow and able to remove the $NO_X$ flowing out from the catalyst.

(3) The exhaust purification system of an internal combustion engine described in above (2), wherein the $NO_X$ purification device can store oxygen, and if the temperature of the catalyst is equal to or greater than the threshold temperature or if predicting a rise in temperature of the catalyst, the air-fuel ratio control device is configured to make the air-fuel ratio of the inflowing exhaust gas richer than the stoichiometric air-fuel ratio so that an oxygen storage amount of the $NO_X$ purification device becomes equal to or less than a lower side reference amount less than the upper side reference amount, then make the air-fuel ratio of the inflowing exhaust gas leaner than the stoichiometric air-fuel ratio so that the oxygen storage amount of the catalyst becomes equal to or greater than the upper side reference amount.

(4) The exhaust purification system of an internal combustion engine described in above (2), further comprising a fuel addition valve supplying fuel to the exhaust passage between the catalyst and the $NO_X$ purification device, wherein the $NO_X$ purification device can store oxygen, and the air-fuel ratio control device is configured to control the fuel addition valve, and if the temperature of the catalyst is equal to or greater than the threshold temperature or if predicting a rise in temperature of the catalyst, supply fuel by the fuel addition valve so that the oxygen storage amount of the $NO_X$ purification device becomes equal to or less than a lower side reference amount less than the upper side reference amount.

(5) An exhaust purification system of an internal combustion engine comprising: a catalyst arranged in an exhaust passage and able to store oxygen; and an air-fuel ratio control device configured to control an air-fuel ratio of inflowing exhaust gas flowing into the catalyst, wherein the catalyst has a precious metal and the precious metal has a property of a vapor pressure at a predetermined temperature becoming higher when oxidized, and if a temperature of the catalyst is equal to or greater than a threshold temperature or if predicting a rise in temperature of the catalyst, the air-fuel ratio control device is configured to make the air-fuel ratio of the inflowing exhaust gas richer than a stoichiometric air-fuel ratio so that an oxygen storage amount of the catalyst becomes equal to or less than a lower side reference amount.

(6) The exhaust purification system of an internal combustion engine described in above (5) or (4), further comprising an HC purification device arranged in the exhaust passage at a downstream side of the catalyst in a direction of exhaust flow and able to remove HC flowing out from the catalyst.

(7) The exhaust purification system of an internal combustion engine described in above (6), the HC purification device can store oxygen, and if the temperature of the catalyst is equal to or greater than the threshold temperature or if predicting a rise in temperature of the catalyst, the air-fuel ratio control device is configured to make the air-fuel ratio of the inflowing exhaust gas leaner than the stoichiometric air-fuel ratio so that an oxygen storage amount of the HC purification device becomes equal to or greater than an upper side reference amount greater than the lower side reference amount, then make the air-fuel ratio of the inflowing exhaust gas richer than the stoichiometric air-fuel ratio so that the oxygen storage amount of the catalyst becomes equal to or less than the lower side reference amount.

(8) The exhaust purification system of an internal combustion engine described in above (6), further comprising an air supply device supplying air to the exhaust passage between the catalyst and HC purification device, wherein the HC purification device can store oxygen, and the air-fuel ratio control device is configured to control the air supply device, and if the temperature of the catalyst is equal to or greater than the threshold temperature or if predicting a rise in temperature of the catalyst, supply air by the air supply device so that the oxygen storage amount of the HC purification device becomes equal to or greater than an upper side reference amount greater than the lower side reference amount.

(9) An exhaust purification system of an internal combustion engine comprising: a catalyst arranged in an exhaust passage and able to store oxygen; and an air-fuel ratio control device configured to control an atmosphere of the catalyst, wherein the catalyst has a precious metal and the precious metal has a property of a vapor pressure at a predetermined temperature becoming lower in a second atmosphere of a reducing atmosphere or an oxidizing atmosphere compared with a first atmosphere of an oxidizing atmosphere or a reducing atmosphere, and if a temperature of the catalyst is equal to or greater than a threshold temperature or if predicting a rise in temperature of the catalyst, the air-fuel ratio control device is configured to make the catalyst the second atmosphere.

(10) The exhaust purification system of an internal combustion engine described in above (9), further comprising a downstream side catalyst arranged in the exhaust passage at a downstream side of the catalyst in a direction of exhaust flow and able to store oxygen, and if the temperature of the catalyst is equal to or greater than the threshold temperature or if predicting a rise in temperature of the catalyst, the air-fuel ratio control device is configured to make the downstream side catalyst the first atmosphere.

Advantageous Effects of Invention

According to the present invention, there is provided an exhaust purification system of an internal combustion engine able to effectively keep a catalyst from deteriorating.

BRIEF DESCRIPTION OF DRAWINGS

FIG. 1 is a view schematically showing an internal combustion engine in which an exhaust purification system of an internal combustion engine according to a first embodiment of the present invention is provided.

FIG. 6 is a view schematically showing an internal combustion engine in which an exhaust purification system of an internal combustion engine according to a second embodiment of the present invention is provided.

DESCRIPTION OF EMBODIMENTS

Figure 2:
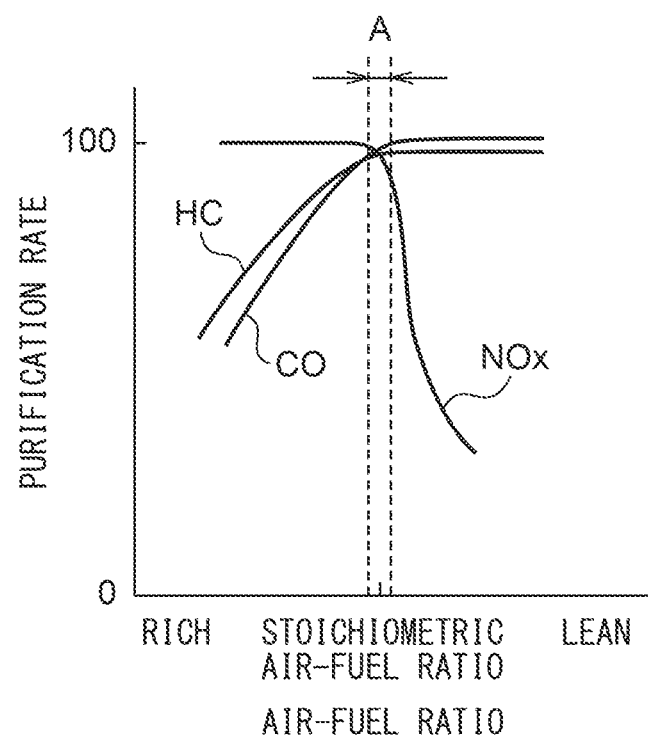
FIG. 2 is a view showing purification characteristics of a three-way catalyst.

Below, referring to the figures, embodiments of the present invention will be explained in detail. Note that, in the following explanation, similar components are assigned the same reference numerals.

First Embodiment

First, referring to FIG. 1 to FIG. 5, a first embodiment of the present invention will be explained.

Explanation of Internal Combustion Engine Overall

FIG. 1 is a view schematically showing an internal combustion engine provided with an exhaust purification system of an internal combustion engine according to a first embodiment of the present invention. The internal combustion engine shown in FIG. 1 is a spark ignition type internal combustion engine. The internal combustion engine is mounted in a vehicle.

Referring to FIG. 1, 1 indicates an engine body, 2 a cylinder block, 3 a piston which reciprocates inside the cylinder block 2, 4 a cylinder head which is fastened to the cylinder block 2, 5 a combustion chamber which is formed between the piston 3 and the cylinder head 4, 6 an intake valve, 7 an intake port, 8 an exhaust valve, and 9 an exhaust port. The intake valve 6 opens and closes the intake port 7, while the exhaust valve 8 opens and closes the exhaust port 9.

As shown in FIG. 1, at the center part of the inside wall surface of the cylinder head 4, a spark plug 10 is arranged. A fuel injector 11 is arranged around the inside wall surface of the cylinder head 4. The spark plug 10 is configured to cause generation of a spark in accordance with an ignition signal. Further, the fuel injector 11 injects a predetermined amount of fuel into the combustion chamber 5 in accordance with an injection signal. In the present embodiment, as the fuel, gasoline with a stoichiometric air-fuel ratio of 14.6 is used.

The intake port 7 in each cylinder is connected through a corresponding intake runner 13 to a surge tank 14. The surge tank 14 is connected through an intake pipe 15 to an air cleaner 16. The intake port 7, intake runner 13, surge tank 14, intake pipe 15, etc., form an intake passage which leads air to the combustion chamber 5. Further, inside the intake pipe 15, a throttle valve 18 which is driven by a throttle valve drive actuator 17 is arranged. The throttle valve 18 can be turned by the throttle valve drive actuator 17 to thereby change the opening area of the intake passage.

On the other hand, the exhaust port 9 in each cylinder is connected to an exhaust manifold 19. The exhaust manifold 19 has a plurality of runners which are connected to the exhaust ports 9 and a header at which these runners are collected. The header of the exhaust manifold 19 is connected to a casing 21 which has a catalyst 20 built into it. The casing 21 is connected to an exhaust pipe 22. The exhaust port 9, the exhaust manifold 19, the casing 21, the exhaust pipe 22, etc., form an exhaust passage which discharges exhaust gas produced due to combustion of the air-fuel mixture in the combustion chamber 5.

Various control routines of the internal combustion engine are performed by an electronic control unit (ECU) 31. That is, the ECU 31 functions as a control device of the internal combustion engine. Outputs of various sensors provided in the internal combustion engine or the vehicle equipped with the internal combustion engine are entered into the ECU 31, and the ECU 31 controls various actuators based on the outputs of the sensors, etc.

The ECU 31 is comprised of a digital computer which is provided with components which are connected together through a bidirectional bus 32 such as a RAM (random access memory) 33, ROM (read only memory) 34, CPU (microprocessor) 35, input port 36, and output port 37. Note that, in the present embodiment, a single ECU 31 is provided, but a plurality of ECUs may be provided for each function.

In the intake pipe 15, an air flow meter 40 detecting the flow rate of air which flows through the intake pipe 15 is arranged. The output of the air flow meter 40 is input through a corresponding AD converter 38 to the input port 36.

Further, at the header of the exhaust manifold 19, i.e., the upstream side of the catalyst 20 in the exhaust flow direction, an air-fuel ratio sensor 41 detecting the air-fuel ratio of the exhaust gas which flows through the inside of the exhaust manifold 19 (that is, the exhaust gas which flows into the catalyst 20) is arranged. The output of the air-fuel ratio sensor 41 is input through the corresponding AD converter 38 to the input port 36.

Further, in the casing 21 housing the catalyst 20 inside it, a temperature sensor 45 detecting the temperature of the catalyst 20 (bed temperature) is arranged. The output of the temperature sensor 45 is input to the input port 36 through a corresponding AD converter 38.

Further, a load sensor 43 generating an output voltage proportional to the amount of depression of an accelerator pedal 42 is connected to the accelerator pedal 42 provided in the vehicle mounting the internal combustion engine. The output voltage of the load sensor 43 is input to the input port 36 through a corresponding AD converter 38. The ECU 31 calculates the engine load based on the output of the load sensor 43.

Further, a crank angle sensor 44 generating an output pulse each time a crankshaft rotates by a predetermined angle (for example 10°) is connected to the input port 36. This output pulse is input to the input port 36. The ECU 31 calculates the engine speed based on the output of the crank angle sensor 44.

On the other hand, the output port 37 is connected through a corresponding drive circuit 39 to various actuators of the internal combustion engine. In the present embodiment, the output port 37 is connected to spark plugs 10, fuel injectors 11, and a throttle valve drive actuator 17, and the ECU 31 controls these. Specifically, the ECU 31 controls the ignition timings of the spark plugs 10, the injection timings and injection amounts of the fuel injectors, and the opening degree of the throttle valve 18.

Note that, the above-mentioned internal combustion engine is a non-supercharged internal combustion engine fueled by gasoline, but the configuration of the internal combustion engine is not limited to the above configuration. Therefore, the cylinder array, mode of injection of fuel, configuration of the intake and exhaust systems, configuration of the valve operation mechanism, presence of any supercharger, and other specific configurations of the internal combustion engine may be different from the configuration shown in FIG. 1. For example, the fuel injectors 11 may be arranged so as to inject fuel to inside the intake ports 7. Further, a configuration for making the EGR recirculate from the exhaust passage to the intake passage may be provided. Further, a particulate filter trapping particulate matter (PM) contained in the exhaust gas etc., may be provided in the exhaust passage.

Explanation of Catalyst

The catalyst 20 arranged in the exhaust passage can store oxygen. For example, it is a three-way catalyst able to simultaneously remove hydrocarbons (HC), carbon monoxide (CO), and nitrogen oxides ($NO_x$). The catalyst 20 has a support made of a ceramic, a precious metal having a catalytic action, and a co-catalyst having an oxygen storage ability (for example, ceria ($CeO_2$)). The precious metal and co-catalyst are carried on the support.

FIG. 2 is a view showing purification characteristics of a three-way catalyst. As shown in FIG. 2, the purification rates of HC, CO and $NO_x$ by the catalyst 20 become extremely high when the air-fuel ratio of the exhaust gas flowing into the catalyst 20 is in the region near the stoichiometric air-fuel ratio (purification window A in FIG. 2). Therefore, the catalyst 20 can effectively remove HC, CO and $NO_X$ if the air-fuel ratio of the exhaust gas is maintained at the stoichiometric air-fuel ratio.

Further, the catalyst 20 stores or releases oxygen in accordance with the air-fuel ratio of the exhaust gas by the co-catalyst. Specifically, the catalyst 20 stores excess oxygen in the exhaust gas when the air-fuel ratio of the exhaust gas is leaner than the stoichiometric air-fuel ratio. On the other hand, the catalyst 20 releases the amount of additional oxygen required for making HC and CO oxidize when the air-fuel ratio of the exhaust gas is richer than the stoichiometric air-fuel ratio. As a result, even if the air-fuel ratio of the exhaust gas is somewhat off from the stoichiometric air-fuel ratio, the air-fuel ratio on the surface of the catalyst 20 is maintained near the stoichiometric air-fuel ratio, and HC, CO and $NO_X$ are effectively removed at the catalyst 20.

Exhaust Purification System of Internal Combustion Engine

Below, an exhaust purification system of an internal combustion engine according to the first embodiment of the present invention (below, simply referred to as the "exhaust purification system") will be explained. The exhaust purification system is provided with a catalyst 20, an air-fuel ratio sensor 41, a temperature sensor 45, and an air-fuel ratio control device. In the present embodiment, the ECU 31 functions as the air-fuel ratio control device.

The air-fuel ratio control device controls the air-fuel ratio of the exhaust gas flowing into the catalyst 20 (below, referred to as the "inflowing exhaust gas"). Specifically, the air-fuel ratio control device sets a target air-fuel ratio of the inflowing exhaust gas and controls the amount of fuel supplied to the combustion chambers 5 so that the air-fuel ratio of the inflowing exhaust gas matches the target air-fuel ratio. For example, the air-fuel ratio control device controls the amount of fuel supplied to the combustion chambers 5 by feedback so that the output air-fuel ratio of the air-fuel ratio sensor 41 matches the target air-fuel ratio. Here, the "output air-fuel ratio" means an air-fuel ratio corresponding to the output value of the air-fuel ratio sensor, that is, the air-fuel ratio detected by the air-fuel ratio sensor.

Note that, the air-fuel ratio control device may control the amount of fuel supplied to the combustion chambers 5 so that the air-fuel ratio of the inflowing exhaust gas matches the target air-fuel ratio without using the air-fuel ratio sensor 41. In this case, the air-fuel ratio control device supplies an amount of fuel calculated from the amount of intake air detected by the air-flow meter 40 and the target air-fuel ratio to the combustion chambers 5 so that the ratio of the fuel and air supplied to the combustion chambers 5 matches the target air-fuel ratio.

Further, the air-fuel ratio control device performs fuel cut control stopping the supply of fuel to the combustion chambers 5 when a predetermined execution condition is satisfied. The predetermined execution condition is, for example, satisfied when the amount of depression of the accelerator pedal 42 is zero or substantially zero (that is, the engine load is zero or substantially zero) and the engine speed is equal to or greater than a predetermined speed higher than the speed at the time of idling. If the fuel cut control is performed, air is supplied from the intake passage to the exhaust passage and air is supplied to the catalyst 20.

Figure 3:
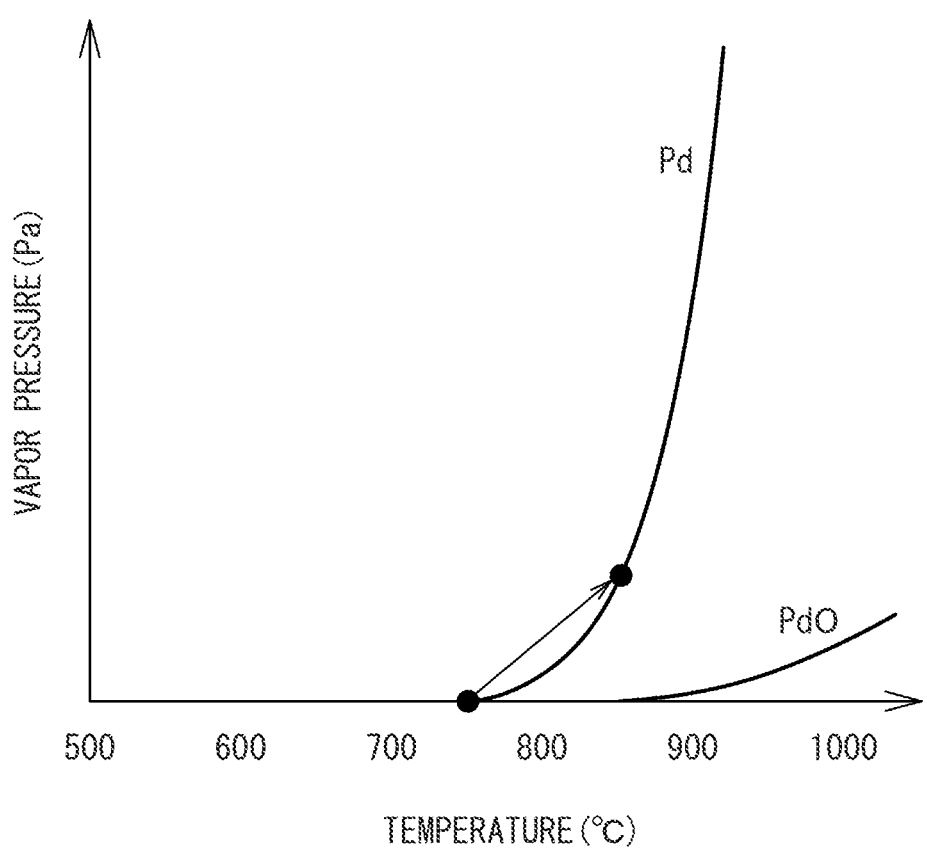
FIG. 3 is a view showing vapor pressure curves of Pd and PdO.

In the present embodiment, the catalyst 20 has palladium (Pd) as a precious metal. FIG. 3 is a view showing the vapor pressure curves of Pd and PdO. As will be understood from FIG. 3, Pd has a vapor pressure higher than PdO at a predetermined temperature (equal to or greater than 750° C.). That is, Pd has the property of the vapor pressure at a predetermined temperature becoming lower when oxidized. In other words, Pd has the property of the vapor pressure at a predetermined temperature becoming lower at an oxidizing atmosphere compared with a reducing atmosphere.

When exhaust gas with an air-fuel ratio with a large lean degree flows into the catalyst 20, the precious metal of the catalyst 20 is oxidized and Pd changes to PdO. For example, if the above-mentioned fuel cut control is performed, oxygen is supplied to the catalyst 20 and Pd changes to PdO. However, right after oxygen is supplied to the catalyst 20, the HC which had been adsorbed at the precious metal reacts with the oxygen and local heat generation of the catalyst 20 occurs. At this time, the precious metal is kept from oxidizing and the precious metal is present as Pd.

For this reason, if oxygen is supplied to the catalyst 20 when the temperature of the catalyst 20 is high, as shown by the arrow mark in FIG. 3, local heat generation of the catalyst 20 causes the vapor pressure of the precious metal to rapidly rise along the vapor pressure curve of Pd. As a result, the precious metal is vaporized off and the catalyst 20 deteriorates.

On the other hand, in the region of a low temperature of the catalyst 20 (in the example of FIG. 3, the region less than 750° C.), the slant of the vapor pressure curve of the previous metal is substantially zero. For this reason, in this temperature region, even if local heat generation of the catalyst 20 causes the temperature of the precious metal to rise, the vapor pressure of the precious metal does not rise. Therefore, it is possible to efficiently keep the catalyst 20 from deteriorating by making the catalyst 20 an oxidizing atmosphere before the temperature of the catalyst 20 becomes higher.

For this reason, in the present embodiment, the air-fuel ratio control device makes the catalyst 20 an oxygen atmosphere when the temperature of the catalyst 20 is equal to or greater than a threshold temperature. The threshold temperature is determined in advance and is set to a temperature at which the vapor pressure of the precious metal will not rise when local heat generation of the catalyst 20 occurs due to the supply of oxygen. For example, the threshold temperature is set to 650° C. to 700° C.

For example, if the temperature of the catalyst 20 is equal to or greater than the threshold temperature, the air-fuel ratio control device makes the air-fuel ratio of the inflowing exhaust gas leaner than the stoichiometric air-fuel ratio so that the oxygen storage amount of the catalyst 20 becomes equal to or greater than an upper side reference amount. The upper side reference amount is determined in advance and is set to an amount greater than half of the maximum oxygen storage amount at the time of a new catalyst. For example, the upper side reference amount is set to an amount of ⅔ to ⅘ of the maximum oxygen storage amount at the time of a new catalyst.

Further, after the oxygen storage amount of the catalyst 20 reaches the upper side reference amount, the air-fuel ratio control device controls the air-fuel ratio of the inflowing exhaust gas so that the oxygen storage amount of the catalyst 20 is maintained at the upper side reference amount until the temperature of the catalyst becomes equal to or less than the threshold temperature. By doing this, the catalyst 20 can be maintained at an oxidizing atmosphere when the temperature of the catalyst 20 is high.

Explanation of Air-Fuel Ratio Control Using Time Chart

Figure 4:
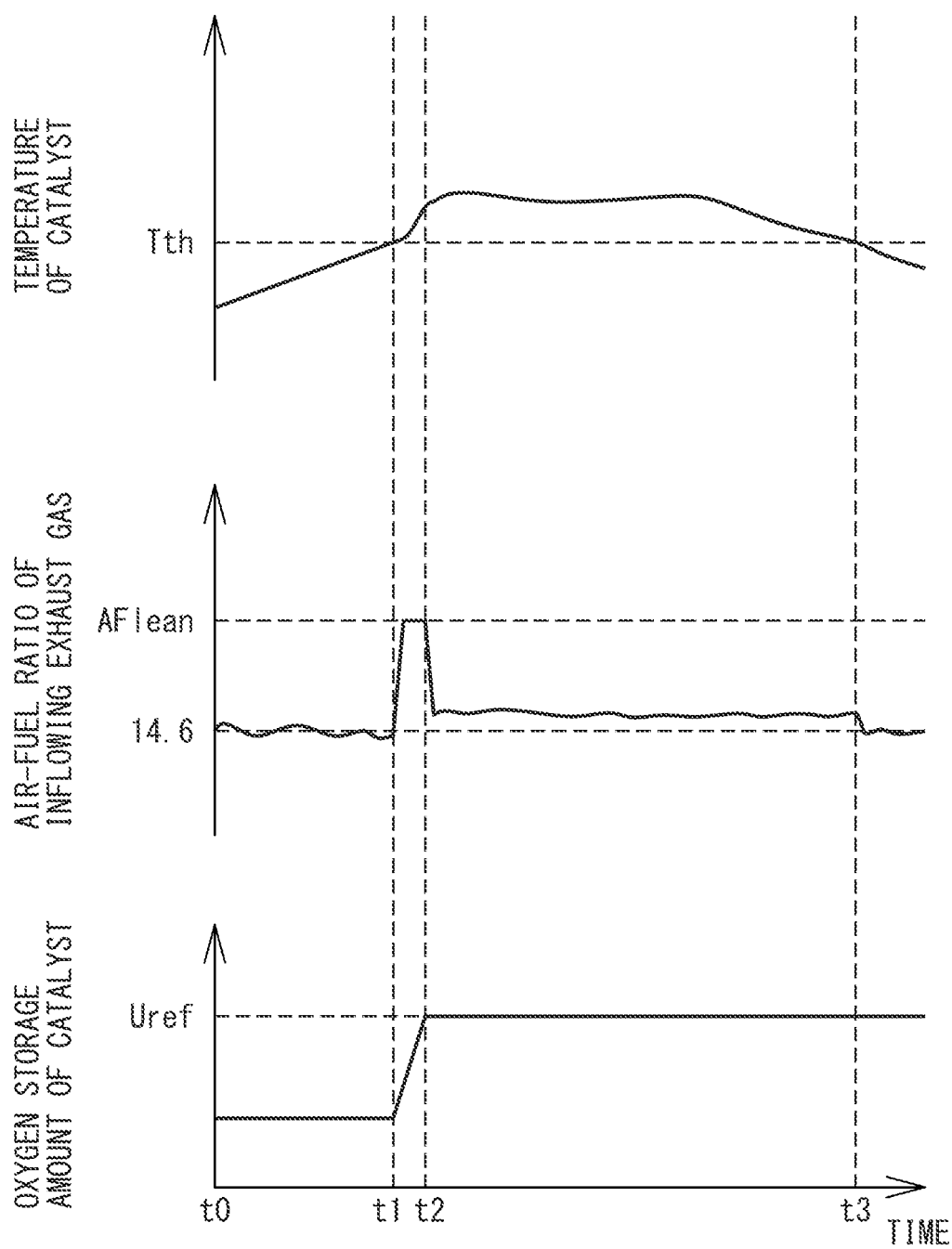
FIG. 4 is a time chart of a temperature of a catalyst etc., when air-fuel ratio control for keeping a catalyst from deteriorating is performed in the first embodiment.

Referring to FIG. 4, air-fuel ratio control for keeping the catalyst 20 from deteriorating will be specifically explained. FIG. 4 is a time chart of a temperature of the catalyst 20, an air-fuel ratio of the inflowing exhaust gas, and an oxygen storage amount of the catalyst 20 when air-fuel ratio control for keeping the catalyst 20 from deteriorating is performed in the first embodiment.

In the illustrated example, at the time t0, the temperature of the catalyst 20 is lower than the threshold temperature Tth. When the temperature of the catalyst 20 is lower than the threshold temperature Tth, the air-fuel ratio of the inflowing exhaust gas is controlled to near the stoichiometric air-fuel ratio in accordance with the operating state of the internal combustion engine.

After the time t0, the temperature of the catalyst 20 rises along with a rise of the engine load and reaches the threshold temperature Tth at the time t1. As a result, air-fuel ratio control for keeping the catalyst 20 from deteriorating is started and the air-fuel ratio of the inflowing exhaust gas is made leaner than the stoichiometric air-fuel ratio to make the catalyst 20 an oxidizing atmosphere. Specifically, the target air-fuel ratio of the inflowing exhaust gas is set to a lean set air-fuel ratio AFlean leaner than the stoichiometric air-fuel ratio. The lean set air-fuel ratio AFlean is determined in advance, for example, is set to 16 to 17.

If the air-fuel ratio of the inflowing exhaust gas is made leaner than the stoichiometric air-fuel ratio, the oxygen supplied to the catalyst 20 reacts with the HC adsorbed at the precious metal of the catalyst 20 and local heat generation of the catalyst 20 occurs. As a result, the amount of rise of the temperature of the catalyst 20 becomes larger.

Further, if the air-fuel ratio of the inflowing exhaust gas is made leaner than the stoichiometric air-fuel ratio, oxygen is supplied to the catalyst 20 and the oxygen storage amount of the catalyst 20 increases. As a result, at the time t2, the oxygen storage amount of the catalyst 20 reaches the upper side reference amount Uref.

After the time t2, the air-fuel ratio of the inflowing exhaust gas is controlled so that the oxygen storage amount of the catalyst 20 is maintained at the upper side reference amount Uref. Specifically, the target air-fuel ratio of the inflowing exhaust gas is set to a value leaner than the stoichiometric air-fuel ratio so that the HC and CO in the exhaust gas are oxidized. The lean degree of the target air-fuel ratio at this time is smaller than the lean degree of the lean set air-fuel ratio AFlean. Note that, the "lean degree" means the difference between the air-fuel ratio leaner than the stoichiometric air-fuel ratio and the stoichiometric air-fuel ratio.

After that, at the time t3, the temperature of the catalyst 20 falls to the threshold temperature Tth. As a result, at the time t3, the air-fuel ratio control for keeping the catalyst 20 from deteriorating ends. For this reason, after the time t3, the air-fuel ratio of the inflowing exhaust gas is controlled to near the stoichiometric air-fuel ratio according to the operating condition of the internal combustion engine.

Processing for Keeping Catalyst From Deteriorating

Figure 5:
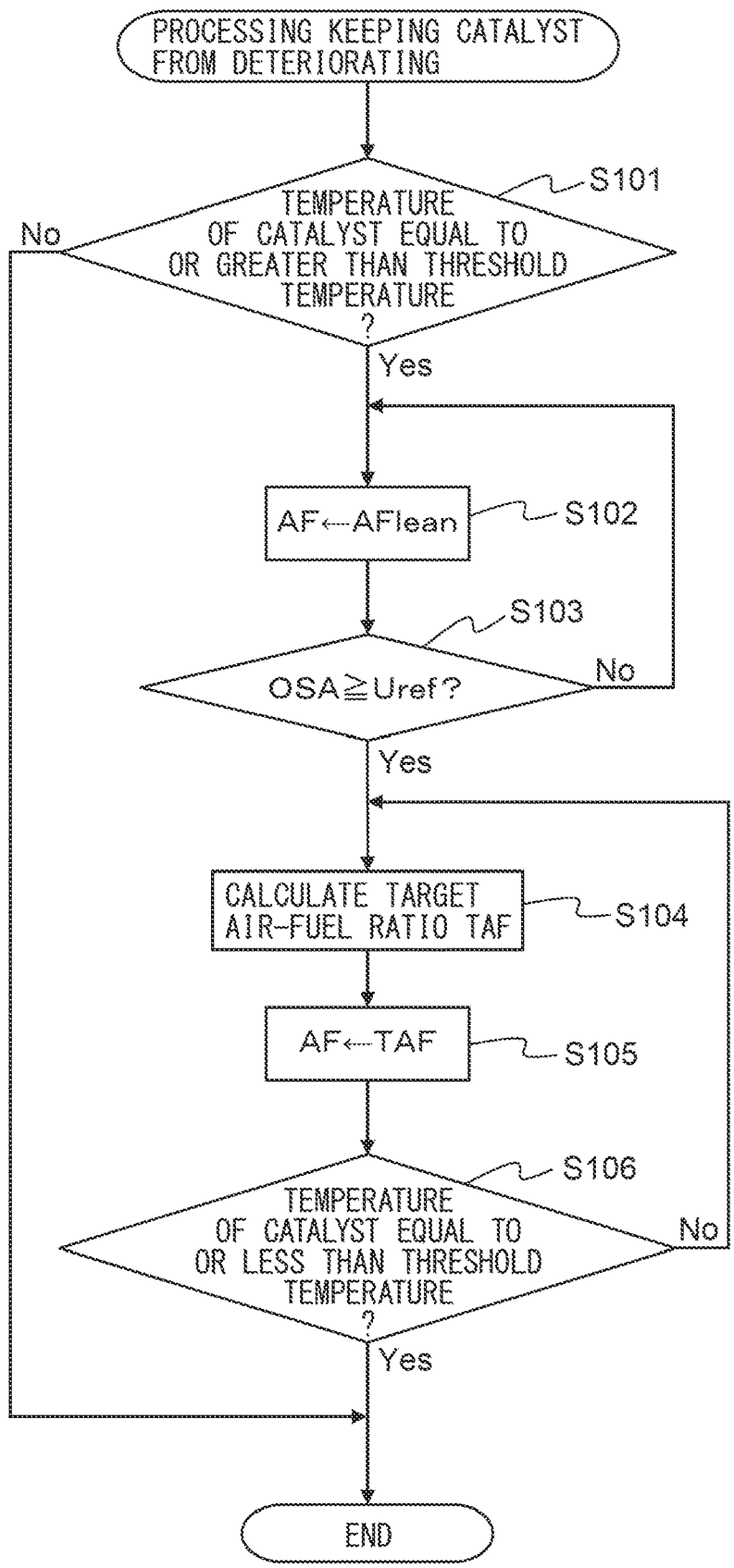
FIG. 5 is a flow chart showing a control routine of processing for keeping a catalyst from deteriorating in the first embodiment.

Below, referring to the flow chart of FIG. 5, air-fuel ratio control for keeping the catalyst 20 from deteriorating will be explained in detail. FIG. 5 is a flow chart showing a control routine of processing for keeping a catalyst from deteriorating in the first embodiment. The control routine is repeatedly performed by the ECU 31 at predetermined time intervals.

First, at step S101, the air-fuel ratio control device judges whether the temperature of the catalyst 20 is equal to or greater than the threshold temperature. For example, the air-fuel ratio control device judges whether the temperature of the catalyst 20 is equal to or greater than the threshold temperature based on the output of the temperature sensor 45.

Note that, the temperature sensor 45 may be arranged at the upstream side of the catalyst 20 in the exhaust passage so as to detect the temperature of the inflowing exhaust gas or may be arranged in the exhaust passage at the downstream side of the catalyst 20 so as to detect the temperature of the exhaust gas flowing out from the catalyst 20. Further, the air-fuel ratio control device may calculate the temperature of the catalyst 20 without using the temperature sensor 45 based on a predetermined state quantity of the internal combustion engine (for example, the amount of intake air, engine load, etc.). In this case, the temperature sensor 45 may be omitted from the exhaust purification system.

If at step S101 it is judged that the temperature of the catalyst 20 is less than the threshold temperature, the control routine ends. On the other hand, if at step S101 it is judged that the temperature of the catalyst 20 is equal to or greater than the threshold temperature, the control routine proceeds to step S102.

At step S102, the air-fuel ratio control device makes the air-fuel ratio of the inflowing exhaust gas leaner than the stoichiometric air-fuel ratio. Specifically, the air-fuel ratio control device sets the target air-fuel ratio of the inflowing exhaust gas to the lean set air-fuel ratio AFlean.

Next, at step S103, the air-fuel ratio control device judges whether the oxygen storage amount OSA of the catalyst 20 is equal to or greater than the upper side reference amount Uref. For example, the air-fuel ratio control device cumulatively adds the oxygen excess/deficiency with respect the stoichiometric air-fuel ratio of the inflowing exhaust gas to thereby calculate the oxygen storage amount OSA of the catalyst 20. The oxygen storage amount OSA of the catalyst 20 is calculated as a value between zero and the maximum oxygen storage amount.

Note that, "the oxygen excess/deficiency with respect to the stoichiometric air-fuel ratio of the inflowing exhaust gas" means the amount of oxygen becoming in excess or the amount of oxygen becoming insufficient when trying to make the air-fuel ratio of the inflowing exhaust gas the stoichiometric air-fuel ratio. When the air-fuel ratio of the inflowing exhaust gas is leaner than the stoichiometric air-fuel ratio, oxygen is stored in the catalyst 20 and the value of the oxygen excess/deficiency becomes positive. On the other hand, when the air-fuel ratio of the inflowing exhaust gas is richer than the stoichiometric air-fuel ratio, oxygen is released from the catalyst 20, therefore the value of the oxygen excess/deficiency becomes negative.

The oxygen excess/deficiency OED is, for example, calculated by the following formula (1) based on the output of the air-fuel ratio sensor 41 and the fuel injection amount:

$$OED = 0.23 \times (AFup - 14.6) \times Qi \quad (1)$$

Here, 0.23 is the concentration of oxygen in the air, 14.6 is the stoichiometric air-fuel ratio, Qi is the amount of fuel injection, and AFup is the output air-fuel ratio of the air-fuel ratio sensor 41.

Note that, the oxygen excess/deficiency OED may be calculated by the following formula (2) based on the output of the air-fuel ratio sensor 41 and the amount of intake air:

$$OED = 0.23 \times (AFup - 14.6) \times Ga/AFup \qquad (2)$$

Here, 0.23 is the concentration of oxygen in the air, 14.6 is the stoichiometric air-fuel ratio, Ga is the amount of intake air, and AFup is the output air-fuel ratio of the air-fuel ratio sensor 41. The amount of intake air Ga is detected by the air-flow meter 40.

Further, the oxygen excess/deficiency OED may be calculated based on the target air-fuel ratio of the inflowing exhaust gas without using the output of the air-fuel ratio sensor 41. That is, in the above formulas (1) and (2), instead of the output air-fuel ratio AFup of the air-fuel ratio sensor 41, the value of the target air-fuel ratio may be used. In this case, the air-fuel ratio sensor 41 may be omitted from the exhaust purification system.

Further, if fuel cut control is controlled, the oxygen storage amount OSA of the catalyst 20 may be corrected to the maximum oxygen storage amount. Further, if the target air-fuel ratio of the inflowing exhaust gas is maintained at a value richer than the stoichiometric air-fuel ratio for equal to or greater than a predetermined time, the oxygen storage amount OSA of the catalyst 20 may be corrected to zero. By such correction, it is possible to decrease the error in calculation of the oxygen storage amount OSA.

If at step S103 it was judged that the oxygen storage amount OSA of the catalyst 20 is less than the upper side reference amount Uref, the control routine returns to step S102 where the target air-fuel ratio of the inflowing exhaust gas is maintained at the lean set air-fuel ratio AFlean. On the other hand, if at step S103 the oxygen storage amount OSA of the catalyst 20 is equal to or greater than the upper side reference amount Uref, the control routine proceeds to step S104.

At step S104, the air-fuel ratio control device calculates the target air-fuel ratio TAF so that the oxygen storage amount OSA of the catalyst 20 is maintained at the upper side reference amount Uref. For example, the air-fuel ratio control device calculates the target air-fuel ratio TAF based on a predetermined state quantity of the internal combustion engine (for example, the amount of intake air, engine load, etc.) so that the HC and CO in the exhaust gas are oxidized. In this case, the air-fuel ratio control device uses a map or calculation formula to calculate the target air-fuel ratio TAF based on the predetermined state quantity of the internal combustion engine. At this time, the target air-fuel ratio TAF is calculated as a value leaner than the stoichiometric air-fuel ratio.

Next, at step S105, the air-fuel ratio control device makes the air-fuel ratio of the inflowing exhaust gas the target air-fuel ratio TAF.

Next, at step S106, the air-fuel ratio control device judges whether the temperature of the catalyst 20 is equal to or less than the threshold temperature. If it is judged that the temperature of the catalyst 20 is higher than the threshold temperature, the control routine returns to step S104 and step S104 and step S105 are again performed. On the other hand, if it is judged that the temperature of the catalyst 20 is equal to or less than the threshold temperature, the control routine ends.

Note that, at step S106, the air-fuel ratio control device may judge whether the temperature of the catalyst 20 is equal to or lower than a predetermined temperature less than the threshold temperature. That is, the air-fuel ratio control device may controls the air-fuel ratio of the inflowing exhaust gas so that the oxygen storage amount of the catalyst 20 is maintained at the upper side reference amount after the oxygen storage amount of the catalyst 20 reaches the upper side reference amount until the temperature of the catalyst becomes equal to or less than a predetermined temperature less than the threshold temperature.

Second Embodiment

The configuration and control of the exhaust purification system in a second embodiment, with the exception of the points explained below, are basically the same as the exhaust purification system in the first embodiment. For this reason, below, the second embodiment of the present invention will be explained centered on parts different from the first embodiment.

FIG. 6 is a view schematically showing an internal combustion engine in which the exhaust purification system of an internal combustion engine according to the second embodiment of the present invention is provided. In the second embodiment, the exhaust purification system is provided with a catalyst (upstream side catalyst) 20, an air-fuel ratio sensor (upstream side air-fuel ratio sensor) 41, a temperature sensor 45, an air-fuel ratio control device, a $NO_X$ purification device 23, and a downstream side air-fuel ratio sensor 46.

The $NO_X$ purification device 23 is arranged in the exhaust passage at the downstream side of the catalyst 20 in the direction of exhaust flow and removes the $NO_X$ flowing out from the catalyst 20. Specifically, the $NO_X$ purification device 23 is housed inside a downstream side casing 24 arranged at the downstream side of the casing (upstream side casing) 21 in the direction of exhaust flow. The casing 21 is connected through the exhaust pipe 22 to the downstream side casing 24.

The downstream side air-fuel ratio sensor 46 is arranged between the catalyst 20 and the $NO_X$ purification device 23 in the exhaust passage and detects the air-fuel ratio of the exhaust gas flowing out from the catalyst 20 (that is, the exhaust gas flowing into the $NO_X$ purification device 23). The output of the downstream side air-fuel ratio sensor 46 is input through a corresponding AD converter 38 to the input port 36.

As explained above, if making the catalyst 20 an oxygen atmosphere in order to keep the catalyst 20 from deteriorating, the purification ability of the catalyst 20 with respect to the $NO_X$ in the exhaust gas falls and $NO_X$ is liable to flow out from the catalyst 20. As opposed to this, in the second embodiment, even if $NO_X$ flows out from the catalyst 20, the $NO_X$ purification device 23 arranged at the downstream side of the catalyst 20 in the direction of exhaust flow can remove the $NO_X$. For this reason, it is possible to keep the exhaust emission from deteriorating while efficiently keeping the catalyst 20 from deteriorating.

In the present embodiment, the $NO_X$ purification device 23 is a three-way catalyst able to store oxygen and, for example, able to simultaneously remove HC, CO, and $NO_X$. That is, the $NO_X$ purification device 23 is configured in the same way as the catalyst 20. The $NO_X$ purification device 23 is also called "an downstream side catalyst".

To enhance the ability of removal of $NO_X$ by an $NO_X$ purification device 23 able to store oxygen, it is necessary to make the $NO_X$ purification device 23 a reducing atmosphere. For this reason, in the second embodiment, the air-fuel ratio control device makes the $NO_X$ purification device 23 a reducing atmosphere if the temperature of the catalyst 20 is equal to or greater than the threshold temperature. By doing this, it is possible to enhance the purification ability of the $NO_X$ purification device 23 and more effectively keep $NO_X$ from flowing out.

The exhaust gas passing through the catalyst 20 flows into the $NO_X$ purification device 23. For this reason, in order to decrease the oxygen storage amount of the $NO_X$ purification device 23 so that the $NO_X$ purification device 23 becomes a reducing atmosphere, the oxygen storage amount of the catalyst 20 has to be made zero. For this reason, if the temperature of the catalyst 20 is equal to or greater than the threshold temperature, the air-fuel ratio control device makes the air-fuel ratio of the inflowing exhaust gas richer than the stoichiometric air-fuel ratio so that the oxygen storage amount of the $NO_X$ purification device 23 becomes equal to or less than a lower side reference amount, then makes the air-fuel ratio of the inflowing exhaust gas leaner than the stoichiometric air-fuel ratio so that the oxygen storage amount of the catalyst 20 becomes equal to or greater than the upper side reference amount. The lower side reference amount is determined in advance and is set to an amount smaller than the upper side reference amount. That is, the lower side reference amount is set to an amount smaller than half of the maximum oxygen storage amount at the time of a new catalyst. For example, the lower side reference amount is set to an amount of ⅕ to ⅓ of the maximum oxygen storage amount at the time of a new catalyst.

Explanation of Air-Fuel Ratio Control Using Time Chart

Figure 7:
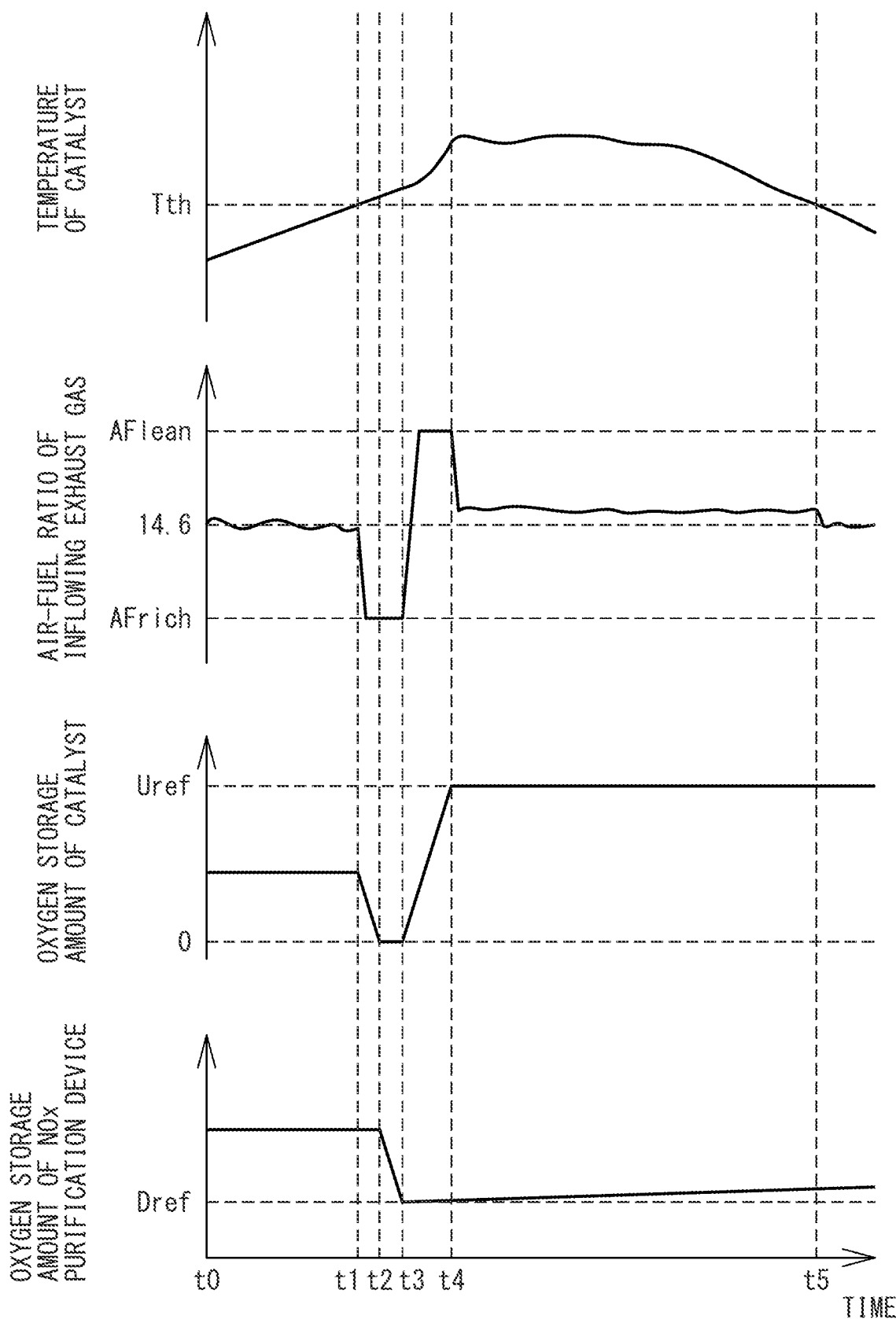
FIG. 7 is a time chart of a temperature of a catalyst etc., when air-fuel ratio control for keeping a catalyst from deteriorating is performed in the second embodiment.

FIG. 7 is a time chart of a temperature of the catalyst 20, air-fuel ratio of the inflowing exhaust gas, oxygen storage amount of the catalyst 20, and oxygen storage amount of the $NO_X$ purification device 23 when air-fuel ratio control for keeping the catalyst 20 from deteriorating is performed in the second embodiment.

In the illustrated example, at the time t0, the temperature of the catalyst 20 is lower than the threshold temperature Tth. When the temperature of the catalyst 20 is lower than the threshold temperature Tth, the air-fuel ratio of the inflowing exhaust gas is controlled to near the stoichiometric air-fuel ratio in accordance with the operating state of the internal combustion engine.

After the time t0, the temperature of the catalyst 20 rises along with the rise of the engine load and, at the time t1, reaches the threshold temperature Tth. As a result, air-fuel ratio control for keeping the catalyst 20 from deteriorating is started and the air-fuel ratio of the inflowing exhaust gas is made richer than the stoichiometric air-fuel ratio to make the $NO_X$ purification device 23 a reducing atmosphere. Specifically, the target air-fuel ratio of the inflowing exhaust gas is set to a rich set air-fuel ratio AFrich richer than the stoichiometric air-fuel ratio. The rich set air-fuel ratio AFrich is determined in advance and, for example, is set to 12 to 13.5.

Further, if the air-fuel ratio of the inflowing exhaust gas is made richer than the stoichiometric air-fuel ratio, first, oxygen is released from the catalyst 20 and the oxygen storage amount of the catalyst 20 is decreased. As a result, at the time t2, the oxygen storage amount of the catalyst 20 becomes zero. When, at the time t1 to the time t2, the oxygen storage amount of the catalyst 20 decreases, the HC and CO in the exhaust gas are removed at the catalyst 20 and the oxygen storage amount of the $NO_X$ purification device 23 is maintained substantially constant.

After the time t2, exhaust gas with an air-fuel ratio richer than the stoichiometric air-fuel ratio flows into the $NO_X$ purification device 23, oxygen is released from the $NO_X$ purification device 23, and the oxygen storage amount of the $NO_X$ purification device 23 decreases. At this time, the oxygen storage amount of the catalyst 20 is maintained at zero.

After that, at the time t3, the oxygen storage amount of the $NO_X$ purification device 23 reaches the lower side reference amount Dref. As a result, at the time t3, the air-fuel ratio of the inflowing exhaust gas is made leaner than the stoichiometric air-fuel ratio to make the catalyst 20 an oxidizing atmosphere. Specifically, the target air-fuel ratio of the inflowing exhaust gas is set to a lean set air-fuel ratio AFlean leaner than the stoichiometric air-fuel ratio. The lean set air-fuel ratio AFlean is determined in advance, for example, is set to 16 to 17.

If the air-fuel ratio of the inflowing exhaust gas is made leaner than the stoichiometric air-fuel ratio, the oxygen supplied to the catalyst 20 reacts with the HC which had been adsorbed at the precious metal of the catalyst 20 and local heat generation of the catalyst 20 occurs. As a result, the amount of rise of the temperature of the catalyst 20 becomes larger.

Further, if the air-fuel ratio of the inflowing exhaust gas is made leaner than the stoichiometric air-fuel ratio, oxygen is supplied to the catalyst 20 and the oxygen storage amount of the catalyst 20 increases. As a result, at the time t4, the oxygen storage amount of the catalyst 20 reaches the upper side reference amount Uref.

After the time t4, the air-fuel ratio of the inflowing exhaust gas is controlled so that the oxygen storage amount of the catalyst 20 is maintained at the upper side reference amount Uref. Specifically, the target air-fuel ratio of the inflowing exhaust gas is set to a value leaner than the stoichiometric air-fuel ratio so that the HC and CO in the exhaust gas are oxidized. The lean degree of the target air-fuel ratio at this time is smaller than the lean degree of the lean set air-fuel ratio AFlean.

After that, at the time t5, the temperature of the catalyst 20 falls to the threshold temperature Tth. As a result, at the time t5, the air-fuel ratio control for keeping the catalyst 20 from deteriorating ends. For this reason, after the time t5, the air-fuel ratio of the inflowing exhaust gas is controlled to near the stoichiometric air-fuel ratio in accordance with the operating state of the internal combustion engine.

Processing for Keeping Catalyst From Deteriorating

Figure 8:
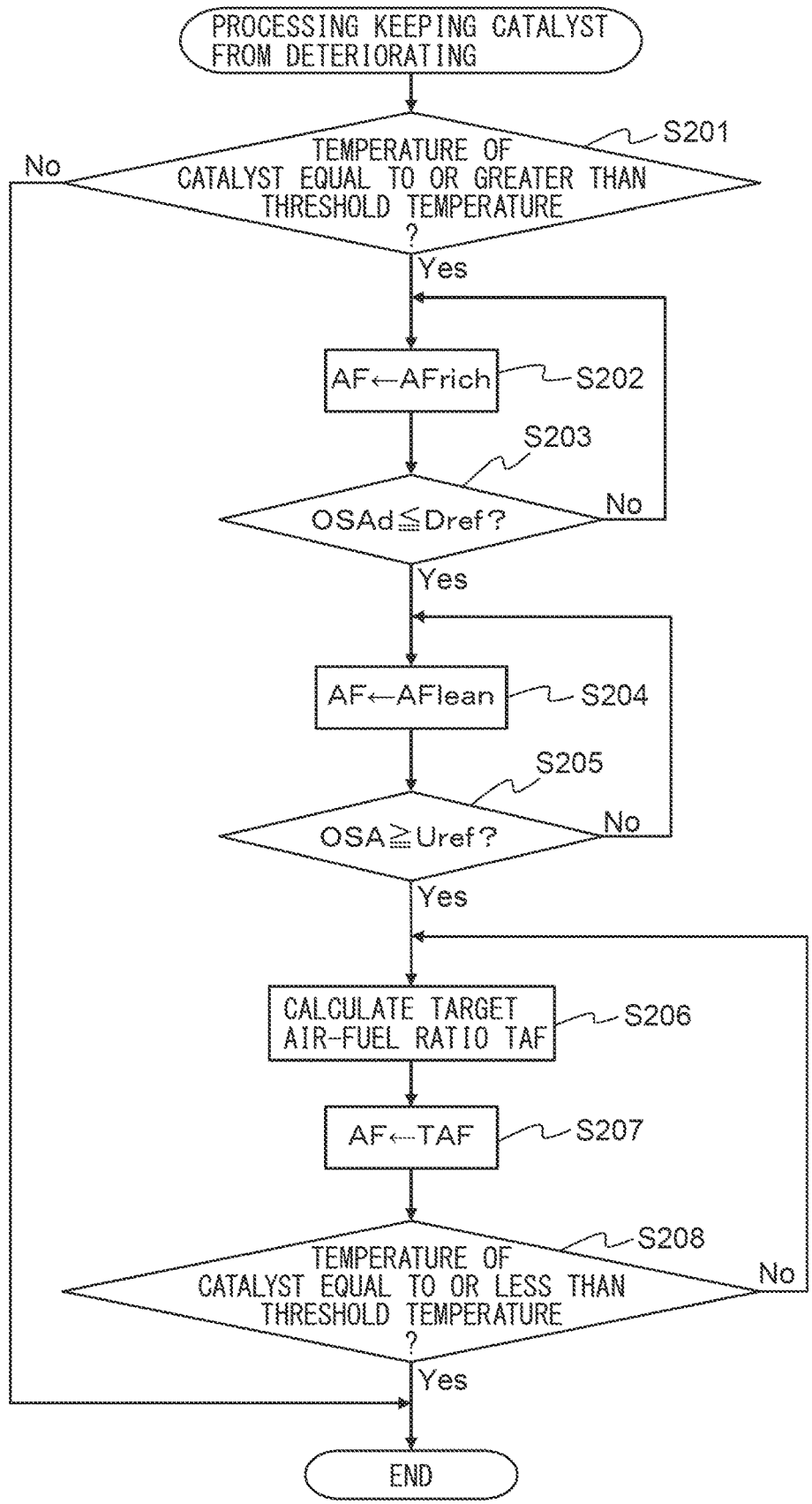
FIG. 8 is a flow chart showing a control routine of processing for keeping a catalyst from deteriorating in the second embodiment.

FIG. 8 is a flow chart showing a control routine of processing for keeping a catalyst from deteriorating in a second embodiment. The control routine is repeatedly performed by the ECU 31 at predetermined time intervals.

First, at step S201, in the same way as step S101 of FIG. 5, the air-fuel ratio control device judges whether the temperature of the catalyst 20 is equal to or greater than the threshold temperature. If it is judged that the temperature of the catalyst 20 is less than the threshold temperature, the control routine ends. On the other hand, if it is judged that the temperature of the catalyst 20 is equal to or greater than the threshold temperature, the control routine proceeds to step S202.

At step S202, the air-fuel ratio control device makes the air-fuel ratio of the inflowing exhaust gas richer than the stoichiometric air-fuel ratio. Specifically, the air-fuel ratio control device sets the target air-fuel ratio of the air-fuel ratio of the inflowing exhaust gas to the rich set air-fuel ratio AFrich.

Next, at step S203, the air-fuel ratio control device judges whether the oxygen storage amount OSAd of the $NO_X$ purification device 23 is equal to or lower than the lower side reference amount Dref. For example, the air-fuel ratio control device cumulatively adds the oxygen excess/deficiency with respect to the stoichiometric air-fuel ratio of the exhaust gas flowing into the $NO_X$ purification device 23 to thereby calculate the oxygen storage amount OSAd of the $NO_X$ purification device 23. The oxygen storage amount OSAd of the $NO_X$ purification device 23 is calculated as a value between zero and the maximum oxygen storage amount.

Note that, "the oxygen excess/deficiency with respect to the stoichiometric air-fuel ratio of the exhaust gas flowing into the $NO_X$ purification device 23" means the amount of oxygen becoming in excess or the amount of oxygen becoming insufficient when trying to make the air-fuel ratio of the exhaust gas flowing into the $NO_X$ purification device 23 the stoichiometric air-fuel ratio. When the air-fuel ratio of the exhaust gas flowing into the $NO_X$ purification device 23 is leaner than the stoichiometric air-fuel ratio, oxygen is stored in the $NO_X$ purification device 23 and the value of the oxygen excess/deficiency becomes positive. On the other hand, when the air-fuel ratio of the exhaust gas flowing into the $NO_X$ purification device 23 is richer than the stoichiometric air-fuel ratio, oxygen is released from the $NO_X$ purification device 23, and the value of the oxygen excess/deficiency becomes negative.

The oxygen excess/deficiency OEDd is, for example, calculated by the following formula (3) based on the output of the downstream side air-fuel ratio sensor 46 and amount of fuel injection.

$$OEDd = 0.23 \times (AFdwn - 14.6) \times Qi \quad (3)$$

Here, 0.23 is the concentration of oxygen in the air, 14.6 is the stoichiometric air-fuel ratio, Qi is the amount of fuel injection, and AFdwn is the output air-fuel ratio of the downstream side air-fuel ratio sensor 46.

Note that, the oxygen excess/deficiency OEDd may be calculated by the following formula (4) based on the output of the downstream side air-fuel ratio sensor 46 and the amount of intake air:

$$OEDd = 0.23 \times (AFdwn - 14.6) \times Ga/AFup \quad (4)$$

Here, 0.23 is the concentration of oxygen in the air, 14.6 is the stoichiometric air-fuel ratio, Ga is the amount of intake air, and AFdwn is the output air-fuel ratio of the downstream side air-fuel ratio sensor 46. The amount of intake air Ga is detected by the air flow meter 40.

Further, the oxygen excess/deficiency OEDd may be calculated without using the output of the downstream side air-fuel ratio sensor 46 based on the target air-fuel ratio of the inflowing exhaust gas. That is, in the above formulas (3), (4), instead of the output air-fuel ratio AFdwn of the downstream side air-fuel ratio sensor 46, the value of the target air-fuel ratio may be used. Note that, when the oxygen storage amount of the catalyst 20 is not zero or the maximum oxygen storage amount, the oxygen excess/deficiency OEDd is made zero. If the output of the downstream side air-fuel ratio sensor 46 is not used, the downstream side air-fuel ratio sensor 46 may be omitted from the exhaust purification system.

Further, if fuel cut control is performed, the oxygen storage amount OSAd of the $NO_X$ purification device 23 may be corrected to the maximum oxygen storage amount. Further, if the target air-fuel ratio of the inflowing exhaust gas is maintained at a value richer than the stoichiometric air-fuel ratio for equal to or greater than a predetermined time, the oxygen storage amount OSAd of the $NO_X$ purification device 23 may also be corrected to zero. By such correction, the calculation error of the oxygen storage amount OSAd can be decreased.

If at step S203 it is judged that the oxygen storage amount OSAd of the $NO_X$ purification device 23 is greater than the lower side reference amount Dref, the control routine returns to step S202 where the target air-fuel ratio of the inflowing exhaust gas is maintained at the rich set air-fuel ratio AFrich. On the other hand, if at step S203 it is judged that the oxygen storage amount OSAd of the $NO_X$ purification device 23 is equal to or less than the lower side reference amount Dref, the control routine proceeds to step S204.

Step S204 to step S208 are performed in the same way as the step S102 to step S106 of FIG. 5. After step S208, the control routine ends.

Note that, the $NO_X$ purification device 23 may be an $NO_X$ adsorbing material adsorbing $NO_X$. In this case, step S202 and step S203 are omitted. Further, the $NO_X$ purification device 23 may be a combination of an $NO_X$ adsorbing material and a three-way catalyst.

Further, the $NO_X$ purification device 23 may be an $NO_X$ storage-reduction catalyst storing $NO_X$. In this case, step S203 is omitted, and at step S202, in order to reduce the $NO_X$ stored in the $NO_X$ purification device 23, the air-fuel ratio control device makes the air-fuel ratio of the inflowing exhaust gas richer than the stoichiometric air-fuel ratio for a predetermined time.

Third Embodiment

The exhaust purification system according to a third embodiment, with the exception of the points explained below, is basically the same as the exhaust purification system according to the second embodiment in configuration and control. For this reason, below, the third embodiment of the present invention will be explained centered on parts different from the second embodiment.

Figure 9:
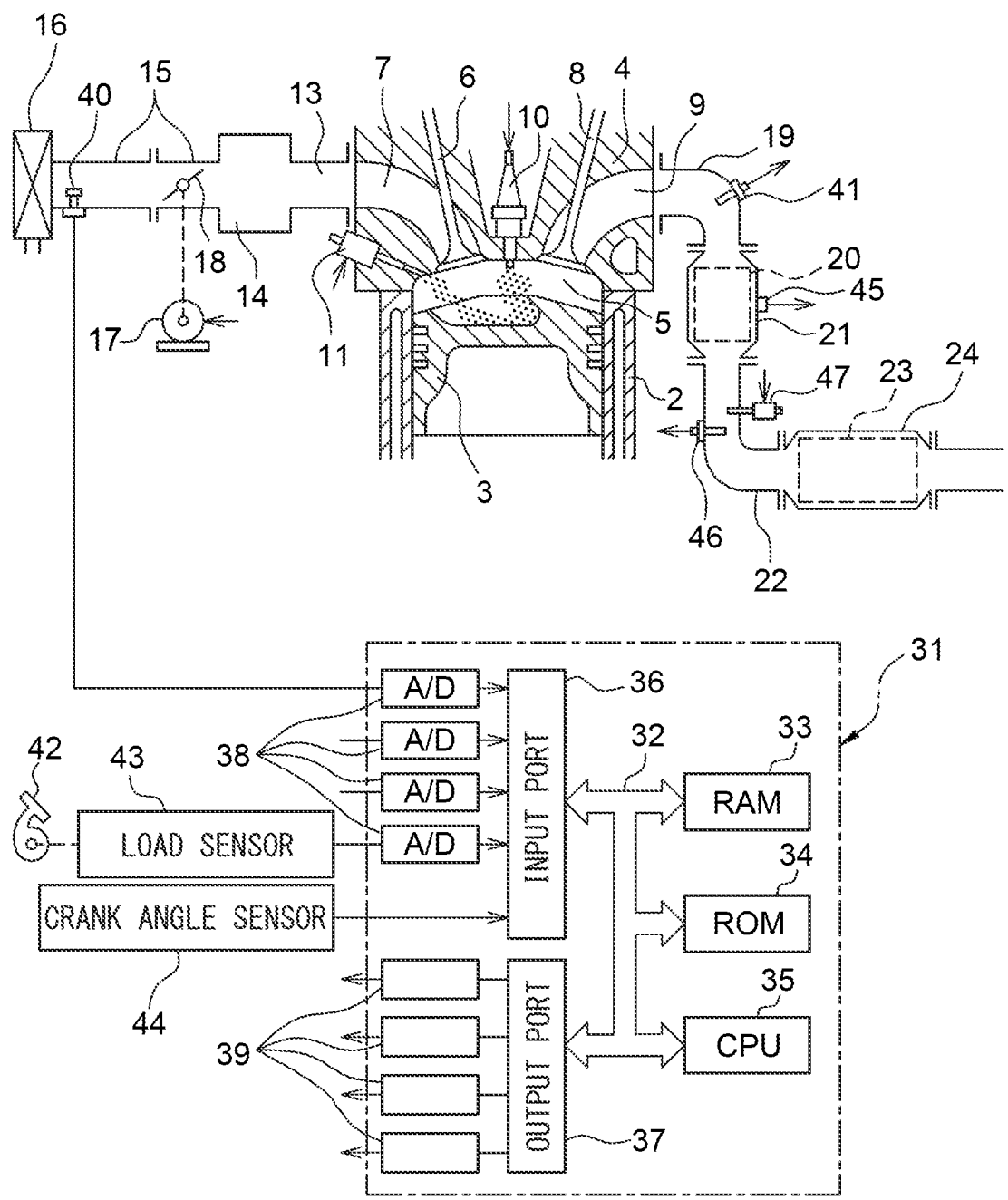
FIG. 9 is a view schematically showing an internal combustion engine in which an exhaust purification system of an internal combustion engine according to a third embodiment of the present invention is provided.

FIG. 9 is a view schematically showing an internal combustion engine in which an exhaust purification system of an internal combustion engine according to the third embodiment of the present invention is provided. In the third embodiment, the exhaust purification system is provided with a catalyst (upstream side catalyst) 20, an air-fuel ratio sensor (upstream side air-fuel ratio sensor) 41, a temperature sensor 45, an air-fuel ratio control device, a $NO_X$ purification device 23, a downstream side air-fuel ratio sensor 46, and a fuel addition valve 47.

The fuel addition valve 47 is arranged between the catalyst 20 and $NO_X$ purification device 23 in the exhaust passage and supplies fuel to the exhaust passage between the catalyst 20 and the $NO_X$ purification device 23. The fuel addition valve 47 is connected to the output port 37. The ECU 31 controls the fuel addition valve 47. Specifically, the ECU 31 controls the injection timing and injection amount of the fuel addition valve 47.

Further, the fuel addition valve 47 is arranged in the exhaust passage at the upstream side from the downstream side air-fuel ratio sensor 46 in the direction of exhaust flow. For this reason, the downstream side air-fuel ratio sensor 46 can detect the air-fuel ratio of the exhaust gas to which fuel injected from the fuel addition valve 47 is added.

In the third embodiment, the air-fuel ratio control device controls the fuel addition valve 47, and if the temperature of the catalyst 20 is equal to or greater than the threshold temperature, supply fuel by the fuel addition valve 47 to thereby make the $NO_X$ purification device 23 a reducing atmosphere. For example, if the temperature of the catalyst 20 is equal to or greater than the threshold temperature, the air-fuel ratio control device supply fuel by the fuel addition valve 47 so that the oxygen storage amount of the $NO_X$ purification device 23 becomes equal to or less than the lower side reference amount. In this case, the oxygen storage amount of the catalyst 20 does not have to be made zero in order to make the $NO_X$ purification device 23 a reducing atmosphere. For this reason, it is possible to quickly make the $NO_X$ purification device 23 a reducing atmosphere.

Processing for Keeping Catalyst From Deteriorating

Figure 10:
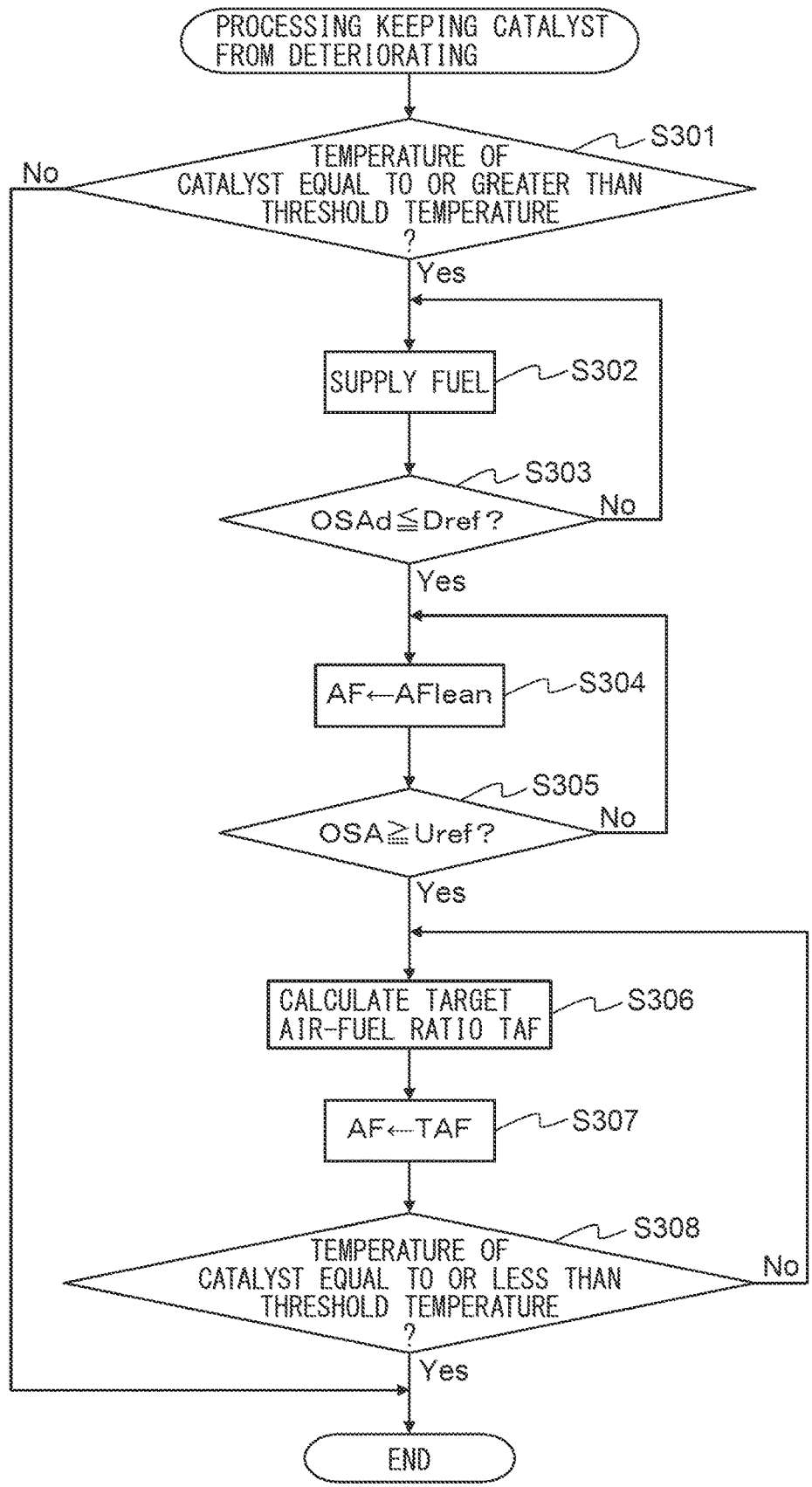
FIG. 10 is a flow chart showing a control routine of processing for keeping a catalyst from deteriorating in the third embodiment.

FIG. 10 is a flow chart showing a control routine of processing for keeping the catalyst from deteriorating in the third embodiment. The control routine is repeatedly performed by the ECU 31 at predetermined time intervals.

First, at step S301, in the same way as step S201 of FIG. 8, the air-fuel ratio control device judges whether the temperature of the catalyst 20 is equal to or greater than the threshold temperature. If it is judged that the temperature of the catalyst 20 is less than the threshold temperature, the control routine ends. On the other hand, if it is judged that the temperature of the catalyst 20 is equal to or greater than the threshold temperature, the control routine proceeds to step S302.

At step S302, the air-fuel ratio control device uses the fuel addition valve 47 to supply fuel. As a result, exhaust gas including fuel, that is, exhaust gas with an air-fuel ratio richer than the stoichiometric air-fuel ratio, flows into the $NO_X$ purification device 23.

Next, at step S303, in the same way as step S203 of FIG. 8, the air-fuel ratio control device judges whether the oxygen storage amount OSAd of the $NO_X$ purification device 23 is equal to or lower than the lower side reference amount Dref. If at step S303 it is judged that the oxygen storage amount OSAd of the $NO_X$ purification device 23 is greater than the lower side reference amount Dref, the control routine returns to step S302 where supply of fuel is continued. On the other hand, if at step S303 it is judged that the oxygen storage amount OSAd of the $NO_X$ purification device 23 is equal to or less than the lower side reference amount Dref, the control routine proceeds to step S304.

Step S304 to step S308 are performed in the same way as step S204 to step S208 of FIG. 8. After step S308, the control routine ends.

Note that, step S304 and step S305 may be performed in parallel with step S302 and step S303.

Further, the $NO_X$ purification device 23 may be an $NO_X$ adsorbing material adsorbing $NO_X$. In this case, step S302 and step S303 are omitted. Further, the $NO_X$ purification device 23 may be a combination of an $NO_X$ adsorbing material and a three-way catalyst.

Further, the $NO_X$ purification device 23 may be an $NO_X$ storage-reduction catalyst storing $NO_X$. In this case, step S303 is omitted, and at step S302, the air-fuel ratio control device supply fuel by the fuel addition valve 47 for a predetermined time to reduce the $NO_X$ stored in the $NO_X$ purification device 23.

Fourth Embodiment

The exhaust purification system according to a fourth embodiment, with the exception of the points explained below, is basically the same as the exhaust purification system according to the first embodiment in configuration and control. For this reason, below, the fourth embodiment of the present invention will be explained centered on parts different from the first embodiment.

Figure 11:
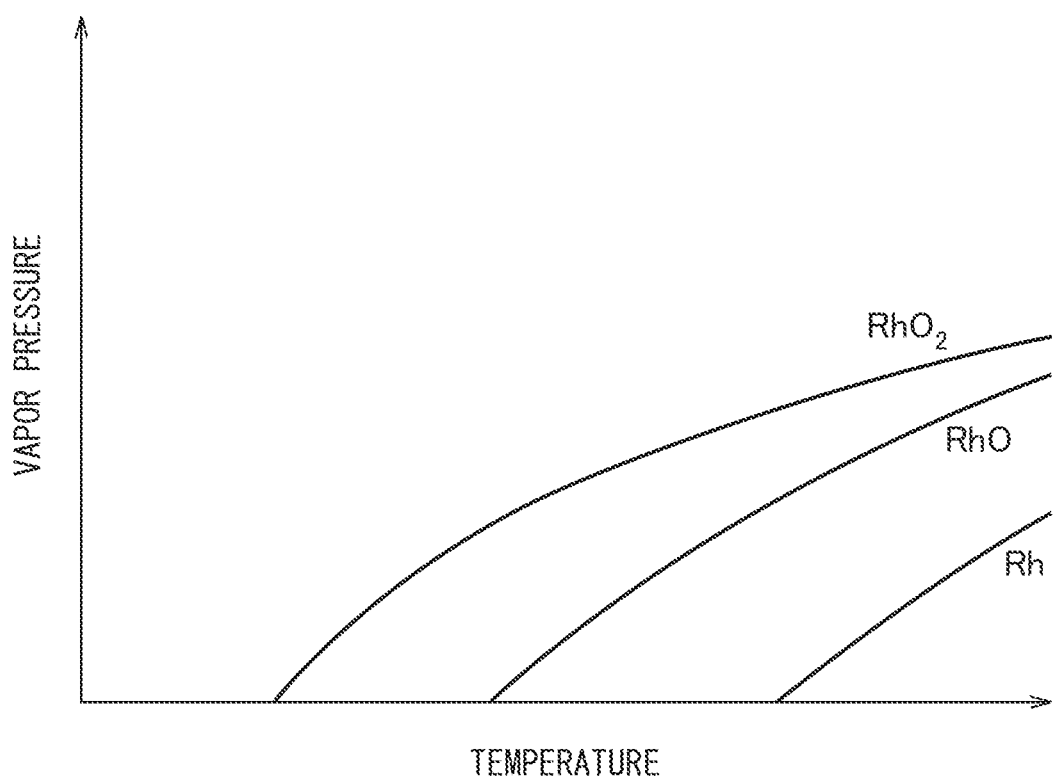
FIG. 11 is a curve showing vapor pressure curves of Rh, RhO, and $RhO_2$.

In the fourth embodiment, the catalyst 20 has rhodium (Rh) or platinum (Pt) as a precious metal. FIG. 11 is a view showing vapor pressure curves of Rh, RhO, and $RhO_2$. As will be understood from FIG. 11, RhO has a vapor pressure higher than Rh at a predetermined temperature. Further, $RhO_2$ has a vapor pressure higher than Rh at a predetermined temperature. That is, Rh has the property of becoming higher in vapor pressure at a predetermined temperature when oxidized. In other words, Rh has the property of becoming lower in vapor pressure at a predetermined temperature in a reducing atmosphere compared with an oxidizing atmosphere.

Figure 12:
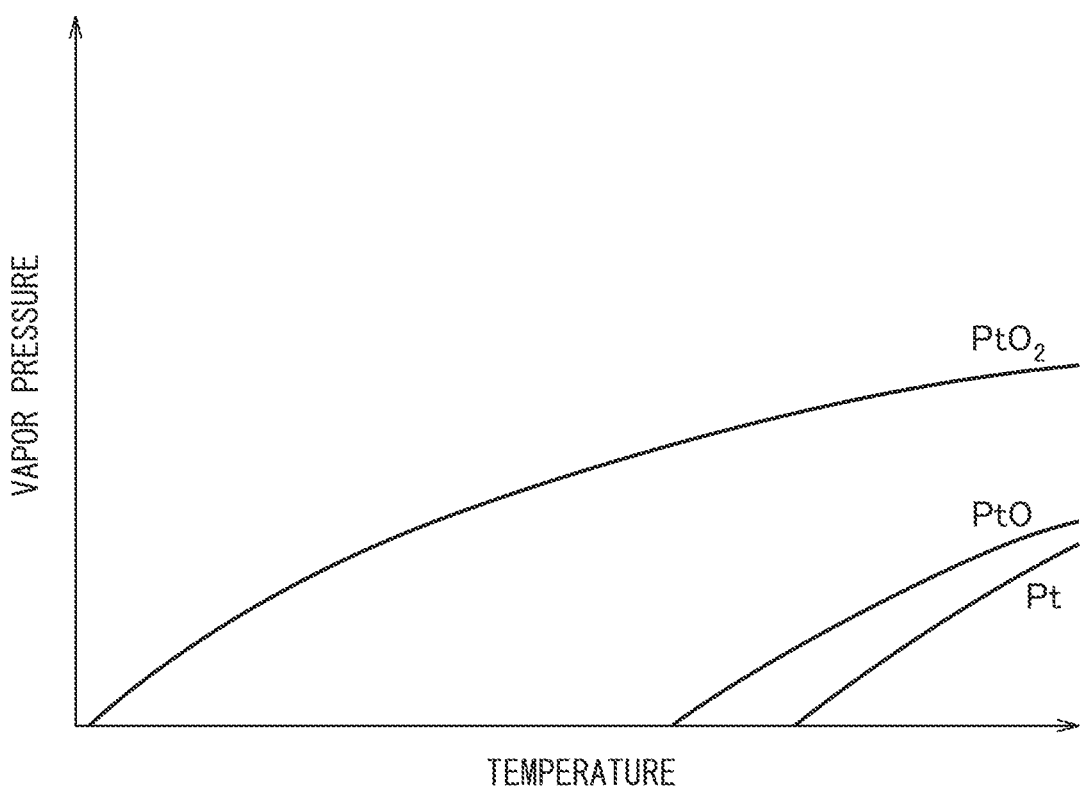
FIG. 12 is a curve showing vapor pressure curves of Pt, PtO, and $PtO_2$.

FIG. 12 is a view showing vapor pressure curves of Pt, PtO, and $PtO_2$. As will be understood from FIG. 12, PtO has a vapor pressure higher than Pt at a predetermined temperature. Further, $PtO_2$ has a vapor pressure higher than Pt at a predetermined temperature. That is, Pt has the property of becoming higher in vapor pressure at a predetermined temperature when oxidized. In other words, Pt has the property of becoming lower in vapor pressure at a predetermined temperature in a reducing atmosphere compared with an oxidizing atmosphere.

If exhaust gas with an air-fuel ratio with a large rich degree flows into the catalyst 20 in the state where the precious metal of the catalyst 20 is oxidized, the precious metal of the catalyst 20 is reduced. However, right after HC etc., are supplied to the catalyst 20, the oxygen adsorbed at the precious metal reacts with the HC etc., and local heat generation of the catalyst 20 occurs. At this time, the precious metal is kept from being reduced.

For this reason, if HC etc., are supplied to the catalyst 20 when the temperature of the catalyst 20 is high, local heat generation of the catalyst 20 causes the vapor pressure of the precious metal to rapidly rise along with the vapor pressure curve of the oxidized precious metal. As a result, the precious metal is vaporized off and the catalyst 20 deteriorates.

On the other hand, in a region where the temperature of the catalyst 20 is low, the slant of the vapor pressure curve of the precious metal is substantially zero. For this reason, in this temperature region, even if local heat generation of the catalyst 20 causes the temperature of the precious metal to rise, the vapor pressure of the precious metal does not rise. Therefore, by making the catalyst 20 a reducing atmosphere before the temperature of the catalyst 20 becomes higher, it is possible to efficiently keep the catalyst 20t from deteriorating.

For this reason, in the present embodiment, if the temperature of the catalyst 20 is equal to or greater than the threshold temperature, the air-fuel ratio control device makes the catalyst 20 a reducing atmosphere. The threshold temperature is determined in advance and is set to a temperature at which the vapor pressure of the precious metal will not rise if local heat generation of the catalyst 20 occurs due to supply of HC etc.

For example, if the temperature of the catalyst 20 is equal to or greater than the threshold temperature, the air-fuel ratio control device makes the air-fuel ratio of the inflowing exhaust gas richer than the stoichiometric air-fuel ratio so that the oxygen storage amount of the catalyst 20 becomes equal to or lower than the lower side reference amount. The lower side reference amount is determined in advance and is set to an amount smaller than half of the maximum oxygen storage amount at the time of a new catalyst. For example, the lower side reference amount is set to an amount of ⅕ to ⅓ of the maximum oxygen storage amount at the time of a new catalyst.

Further, after the oxygen storage amount of the catalyst 20 reaches the lower side reference amount, the air-fuel ratio control device controls the air-fuel ratio of the inflowing exhaust gas so that the oxygen storage amount of the catalyst 20 is maintained at the lower side reference amount until the temperature of the catalyst becomes equal to or less than the threshold temperature. By doing this, when the temperature of the catalyst 20 is high, the catalyst 20 can be maintained at a reducing atmosphere.

Explanation of Air-Fuel Ratio Control Using Time Chart

Figure 13:
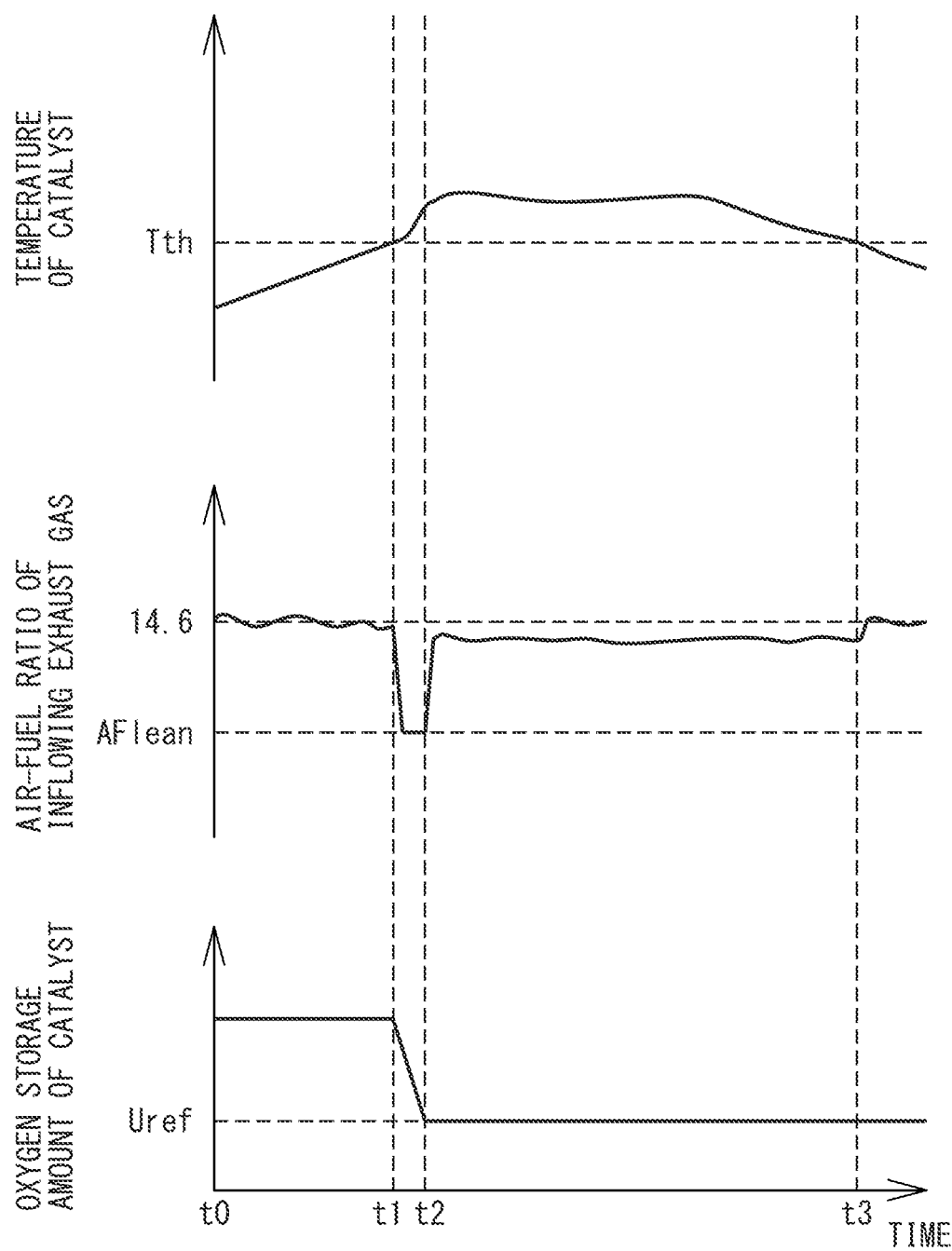
FIG. 13 is a time chart of a temperature of a catalyst etc., when air-fuel ratio control for keeping a catalyst from deteriorating is performed in a fourth embodiment.

FIG. 13 is a time chart of the temperature of the catalyst 20, air-fuel ratio of the inflowing exhaust gas, and oxygen storage amount of the catalyst 20 when air-fuel ratio control for keeping the catalyst 20 from deteriorating is performed in the fourth embodiment.

In the illustrated example, at the time t0, the temperature of the catalyst 20 is lower than the threshold temperature Tth. When the temperature of the catalyst 20 is lower than the threshold temperature Tth, the air-fuel ratio of the inflowing exhaust gas is controlled to near the stoichiometric air-fuel ratio in accordance with the operating state of the internal combustion engine.

After the time t0, the temperature of the catalyst 20 rises along with the rise of the engine load and reaches the threshold temperature Tth at the time t1. As a result, air-fuel ratio control for keeping the catalyst 20 from deteriorating is started. To make the catalyst 20 a reducing atmosphere, the air-fuel ratio of the inflowing exhaust gas is made richer than the stoichiometric air-fuel ratio. Specifically, the target air-fuel ratio of the inflowing exhaust gas is set to a rich set air-fuel ratio AFrich richer than the stoichiometric air-fuel ratio. The rich set air-fuel ratio AFrich is determined in advance and, for example, is set to 12 to 13.5.

If the air-fuel ratio of the inflowing exhaust gas is richer than the stoichiometric air-fuel ratio, the HC etc., supplied to the catalyst 20 react with the oxygen adsorbed at the precious metal of the catalyst 20 and local heat generation of the catalyst 20 occurs. As a result, the amount of rise of the temperature of the catalyst 20 becomes greater.

Further, if the air-fuel ratio of the inflowing exhaust gas is made richer than the stoichiometric air-fuel ratio, oxygen is released from the catalyst 20 and the oxygen storage amount of the catalyst 20 decreases. As a result, at the time t2, the oxygen storage amount of the catalyst 20 reaches the lower side reference amount Dref.

After the time t2, the air-fuel ratio of the inflowing exhaust gas is controlled so that the oxygen storage amount of the catalyst 20 is maintained at the lower side reference amount Dref. Specifically, the target air-fuel ratio of the inflowing exhaust gas is set to a value richer than the stoichiometric air-fuel ratio so that the $NO_X$ in the exhaust gas is reduced. The rich degree of the target air-fuel ratio at this time is smaller than the rich degree of the rich set air-fuel ratio AFrich. Note that, the "rich degree" means the difference between the air-fuel ratio richer than the stoichiometric air-fuel ratio and the stoichiometric air-fuel ratio.

After that, at the time t3, the temperature of the catalyst 20 falls to the threshold temperature Tth. As a result, at the time t3, air-fuel ratio control for keeping the catalyst 20 from deteriorating is ended. For this reason, after the time t3, the air-fuel ratio of the inflowing exhaust gas is controlled to near the stoichiometric air-fuel ratio in accordance with the operating state of the internal combustion engine.

Processing for Keeping Catalyst From Deteriorating

Figure 14:
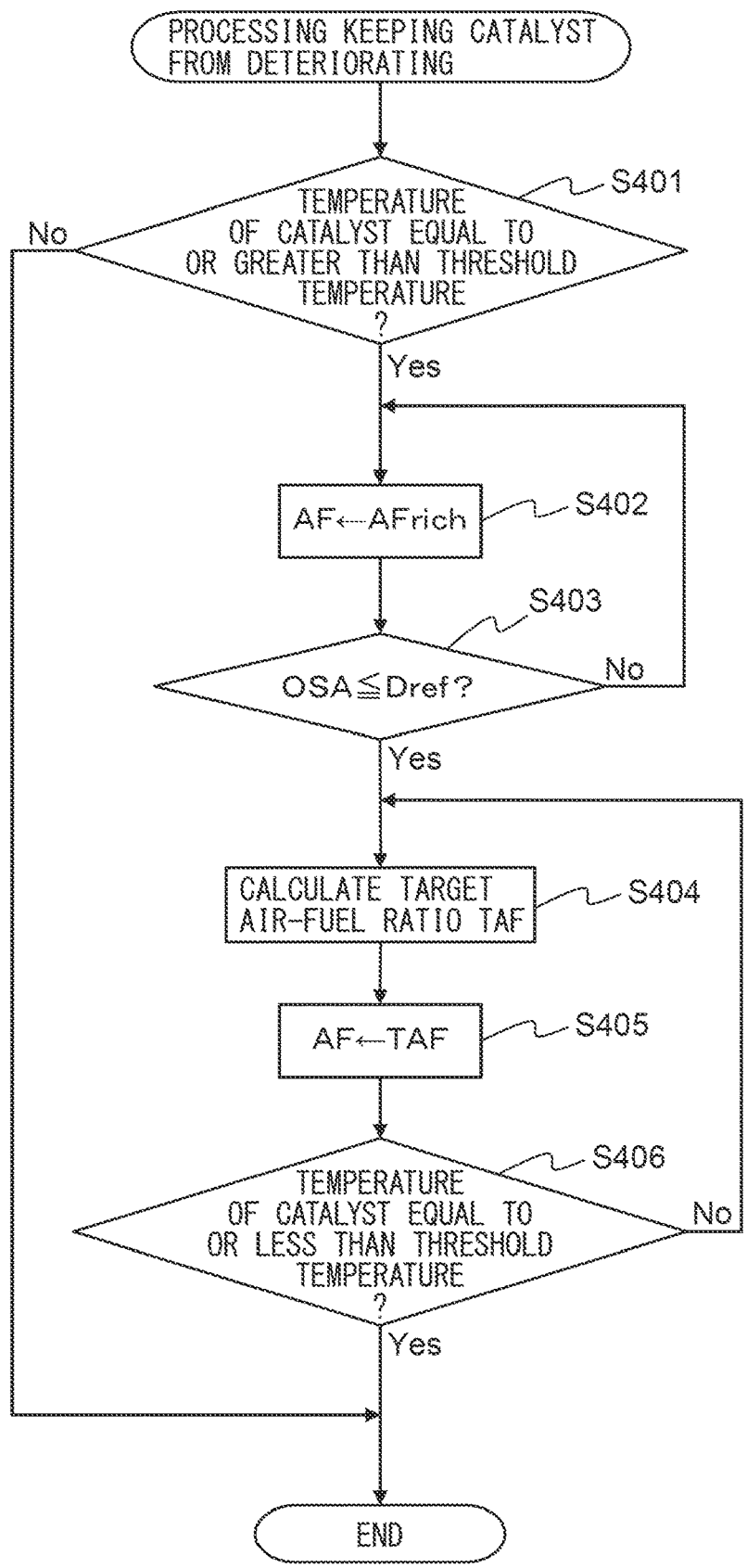
FIG. 14 is a flow chart showing a control routine of processing for keeping a catalyst from deteriorating in the fourth embodiment.

Below, referring to the flow chart of FIG. 14, air-fuel ratio control for keeping the catalyst 20 from deteriorating will be explained in detail. FIG. 14 is a flow chart showing a control routine of processing for keeping the catalyst from deteriorating in the fourth embodiment. The control routine is repeatedly performed by the ECU 31 at predetermined time intervals.

First, at step S401, in the same way as step S101 of FIG. 5, the air-fuel ratio control device judges whether the temperature of the catalyst 20 is equal to or greater than the threshold temperature. If it is judged that the temperature of the catalyst 20 is less than the threshold temperature, the control routine ends. On the other hand, if it is judged that the temperature of the catalyst 20 is equal to or greater than the threshold temperature, the control routine proceeds to step S402.

At step S402, the air-fuel ratio control device makes the air-fuel ratio of the inflowing exhaust gas richer than the stoichiometric air-fuel ratio. Specifically, the air-fuel ratio control device sets the target air-fuel ratio of the inflowing exhaust gas to the rich set air-fuel ratio AFrich.

Next, at step S403, the air-fuel ratio control device judges whether the oxygen storage amount OSA of the catalyst 20 is equal to or less than the lower side reference amount Dref. For example, in the same way as step S103 of FIG. 5, the air-fuel ratio control device cumulatively adds the oxygen excess/deficiency with respect the stoichiometric air-fuel ratio of the inflowing exhaust gas to thereby calculate the oxygen storage amount OSA of the catalyst 20.

If at step S403 it is judged that the oxygen storage amount OSA of the catalyst 20 is greater than the lower side reference amount Dref, the control routine returns to step S402 where the target air-fuel ratio of the inflowing exhaust gas is maintained at the rich set air-fuel ratio AFrich. On the other hand, if at step S403 it is judged that the oxygen storage amount OSA of the catalyst 20 is equal to or less than the lower side reference amount Uref, the control routine proceeds to step S404.

At step S404, the air-fuel ratio control device calculates the target air-fuel ratio TAF so that the oxygen storage amount OSA of the catalyst 20 is maintained at the lower side reference amount Dref. For example, the air-fuel ratio control device calculates the target air-fuel ratio TAF based on a predetermined state quantity of the internal combustion engine (for example, the amount of intake air, engine load, etc.) so that the $NO_X$ in the exhaust gas is reduced. In this case, the air-fuel ratio control device calculates the target air-fuel ratio TAF using a map or calculation formula based on the predetermined state quantity of the internal combustion engine. At this time, the target air-fuel ratio TAF is calculated as a value richer than the stoichiometric air-fuel ratio.

Next, at step S405, the air-fuel ratio control device makes the air-fuel ratio of the inflowing exhaust gas the target air-fuel ratio TAF.

Next, at step S406, the air-fuel ratio control device judges whether the temperature of the catalyst 20 is equal to or less than the threshold temperature. If it is judged that the temperature of the catalyst 20 is higher than the threshold temperature, the control routine returns to step S404 and step S404 and step S405 are again performed. On the other hand, if it is judged that the temperature of the catalyst 20 is equal to or less than the threshold temperature, the control routine ends.

Note that, at step S406, the air-fuel ratio control device may judge whether the temperature of the catalyst 20 is equal to or less than a predetermined temperature less than the threshold temperature. That is, after the oxygen storage amount of the catalyst 20 reaches the lower side reference amount, the air-fuel ratio control device may control the air-fuel ratio of the inflowing exhaust gas so that the oxygen storage amount of the catalyst 20 is maintained at the lower side reference amount until the temperature of the catalyst becomes equal to or less than a predetermined temperature less than the threshold temperature.

Fifth Embodiment

The configuration and control of the exhaust purification system in a fifth embodiment, with the exception of the points explained below, are basically the same as the exhaust purification system in the fourth embodiment. For this reason, below, the fifth embodiment of the present invention will be explained centered on parts different from the fourth embodiment.

The exhaust purification system in the fifth embodiment is applied to the internal combustion engine shown in FIG. 6. In the fifth embodiment, the exhaust purification system is provided with a catalyst (upstream side catalyst) 20, an air-fuel ratio sensor (upstream side air-fuel ratio sensor) 41, a temperature sensor 45, an air-fuel ratio control device, an HC purification device 23, and a downstream side air-fuel ratio sensor 46.

The HC purification device 23 is arranged in the exhaust passage at the downstream side in the direction of exhaust flow of the catalyst 20 and removes the HC flowing out from the catalyst 20. Specifically, the HC purification device 23 is housed inside the downstream side casing 24 arranged at the downstream side of the casing (upstream side casing) 21 in the direction of exhaust flow. The casing 21 is connected to the downstream side casing 24 through the exhaust pipe 22.

As explained above, if making the catalyst 20 a reducing atmosphere to keep the catalyst 20 from deteriorating, the purification ability of the catalyst 20 with respect to the HC in the exhaust gas falls and HC is liable to flow out from the catalyst 20. As opposed to this, in the second embodiment, even if HC flows out from the catalyst 20, the HC purification device 23 arranged at the downstream side of the catalyst 20 in the direction of exhaust flow can be used to remove the HC. For this reason, it is possible to keep the exhaust emission from deteriorating while efficiently keeping the catalyst 20 from deteriorating.

In the present embodiment, the HC purification device 23 is able to store oxygen, for example, is a three-way catalyst able to simultaneously remove HC, CO, and $NO_X$. That is, the HC purification device 23 has a configuration similar to the catalyst 20. The HC purification device 23 is also called a downstream side catalyst.

To enhance the ability of removal of HC by the HC purification device 23 able to store oxygen, the HC purification device 23 has to be made an oxidizing atmosphere. For this reason, in the second embodiment, if the temperature of the catalyst 20 is equal to or greater than the threshold temperature, the air-fuel ratio control device makes the $NO_X$ purification device 23 an oxidizing atmosphere. By doing this, it is possible to raise the purification ability of the HC purification device 23 and more effectively keep HC from flowing out.

Exhaust gas passing through the catalyst 20 flows in the HC purification device 23. For this reason, to make the oxygen storage amount of the HC purification device 23 increase so that the HC purification device 23 becomes an oxidizing atmosphere, the oxygen storage amount of the catalyst 20 must be made the maximum oxygen storage amount. For this reason, if the temperature of the catalyst 20 is equal to or greater than the threshold temperature, the air-fuel ratio control device makes the air-fuel ratio of the inflowing exhaust gas leaner than the stoichiometric air-fuel ratio so that the oxygen storage amount of the HC purification device 23 becomes equal to or greater than the upper side reference amount. After that, it makes the air-fuel ratio of the inflowing exhaust gas richer than the stoichiometric air-fuel ratio so that the oxygen storage amount of the catalyst 20 becomes equal to or less than the lower side reference amount. The upper side reference amount is determined in advance and is set to an amount greater than the lower side reference amount. That is, the upper side reference amount is set to an amount greater than half of the maximum oxygen storage amount at the time of a new catalyst. For example, the upper side reference amount is set to an amount of ⅔ to ⅘ the maximum oxygen storage amount at the time of a new catalyst.

Explanation of Air-Fuel Ratio Control Using Time Chart

Figure 15:
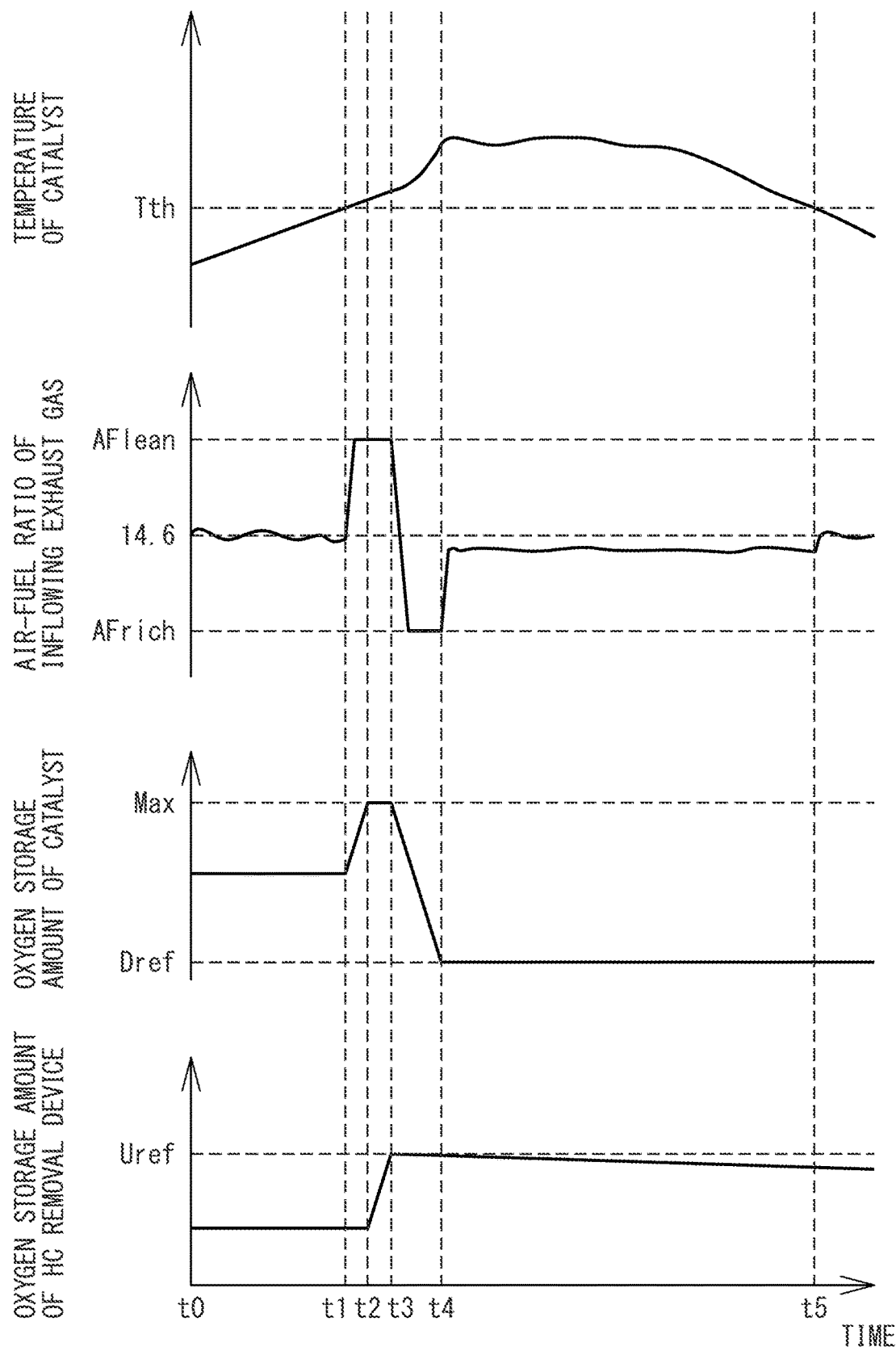
FIG. 15 is a time chart of a temperature of a catalyst etc., when air-fuel ratio control for keeping a catalyst from deteriorating is performed in a fifth embodiment.

FIG. 15 is a time chart of the temperature of the catalyst 20, air-fuel ratio of the inflowing exhaust gas, oxygen storage amount of the catalyst 20, and oxygen storage amount of the HC purification device 23 when air-fuel ratio control for keeping the catalyst 20 from deteriorating is performed in the fifth embodiment.

In the illustrated example, at the time t0, the temperature of the catalyst 20 is lower than the threshold temperature Tth. When the temperature of the catalyst 20 is lower than the threshold temperature Tth, the air-fuel ratio of the inflowing exhaust gas is controlled to near the stoichiometric air-fuel ratio in accordance with the operating state of the internal combustion engine.

After the time t0, the temperature of the catalyst 20 rises along with a rise of the engine load and reaches the threshold temperature Tth at the time t1. As a result, the air-fuel ratio control for keeping the catalyst 20 from deteriorating is started and the air-fuel ratio of the inflowing exhaust gas is made leaner than the stoichiometric air-fuel ratio to make the HC purification device 23 an oxidizing atmosphere. Specifically, the target air-fuel ratio of the inflowing exhaust gas is set to the lean set air-fuel ratio AFlean leaner than the stoichiometric air-fuel ratio. The lean set air-fuel ratio AFrich is determined in advance, for example, is set to 16 to 17.

Further, if the air-fuel ratio of the inflowing exhaust gas is made leaner than the stoichiometric air-fuel ratio, first, oxygen is stored at the catalyst 20 and the oxygen storage amount of the catalyst 20 increases. As a result, at the time t2, the oxygen storage amount of the catalyst 20 becomes the maximum oxygen storage amount. When at the time t1 to the time t2 the oxygen storage amount of the catalyst 20 increases, the $NO_X$ in the exhaust gas is removed at the catalyst 20 and the oxygen storage amount of the HC purification device 23 is maintained substantially constant.

After the time t2, exhaust gas with an air-fuel ratio leaner than the stoichiometric air-fuel ratio flows into the HC purification device 23, oxygen is stored in the HC purification device 23, and the oxygen storage amount of the HC purification device 23 increases. At this time, the oxygen storage amount of the catalyst 20 is maintained at the maximum oxygen storage amount.

After that, at the time t3, the oxygen storage amount of the HC purification device 23 reaches the upper side reference amount Uref. As a result, at the time t3, the air-fuel ratio of the inflowing exhaust gas is made richer than the stoichiometric air-fuel ratio to make the catalyst 20 a reducing atmosphere. Specifically, the target air-fuel ratio of the inflowing exhaust gas is set to a rich set air-fuel ratio AFrich richer than the stoichiometric air-fuel ratio. The rich set air-fuel ratio AFrich is determined in advance and, for example, is set to 12 to 13.5.

If the air-fuel ratio of the inflowing exhaust gas is made richer than the stoichiometric air-fuel ratio, the HC etc., supplied to the catalyst 20 react with the oxygen adsorbed at the precious metal of the catalyst 20 and local heat generation of the catalyst 20 occurs. As a result, the amount of rise of the temperature of the catalyst 20 becomes greater.

Further, if the air-fuel ratio of the inflowing exhaust gas is made richer than the stoichiometric air-fuel ratio, oxygen is released from the catalyst 20 and the oxygen storage amount of the catalyst 20 decreases. As a result, at the time t4, the oxygen storage amount of the catalyst 20 reaches the lower side reference amount Dref.

After the time t4, the air-fuel ratio of the inflowing exhaust gas is controlled so that the oxygen storage amount of the catalyst 20 is maintained at the lower side reference amount Dref. Specifically, the target air-fuel ratio of the inflowing exhaust gas is set to a value richer than the stoichiometric air-fuel ratio so that the $NO_X$ in the exhaust gas is reduced. The rich degree of the target air-fuel ratio at this time is smaller than the rich degree of the rich set air-fuel ratio AFrich.

After that, at the time t5, the temperature of the catalyst 20 falls to the threshold temperature Tth. As a result, at the time t5, the air-fuel ratio control for keeping the catalyst 20 from deteriorating is ended. For this reason, after the time t5, the air-fuel ratio of the inflowing exhaust gas is controlled to near the stoichiometric air-fuel ratio in accordance with the operating state of the internal combustion engine.

Processing for Keeping Catalyst From Deteriorating

Figure 16:
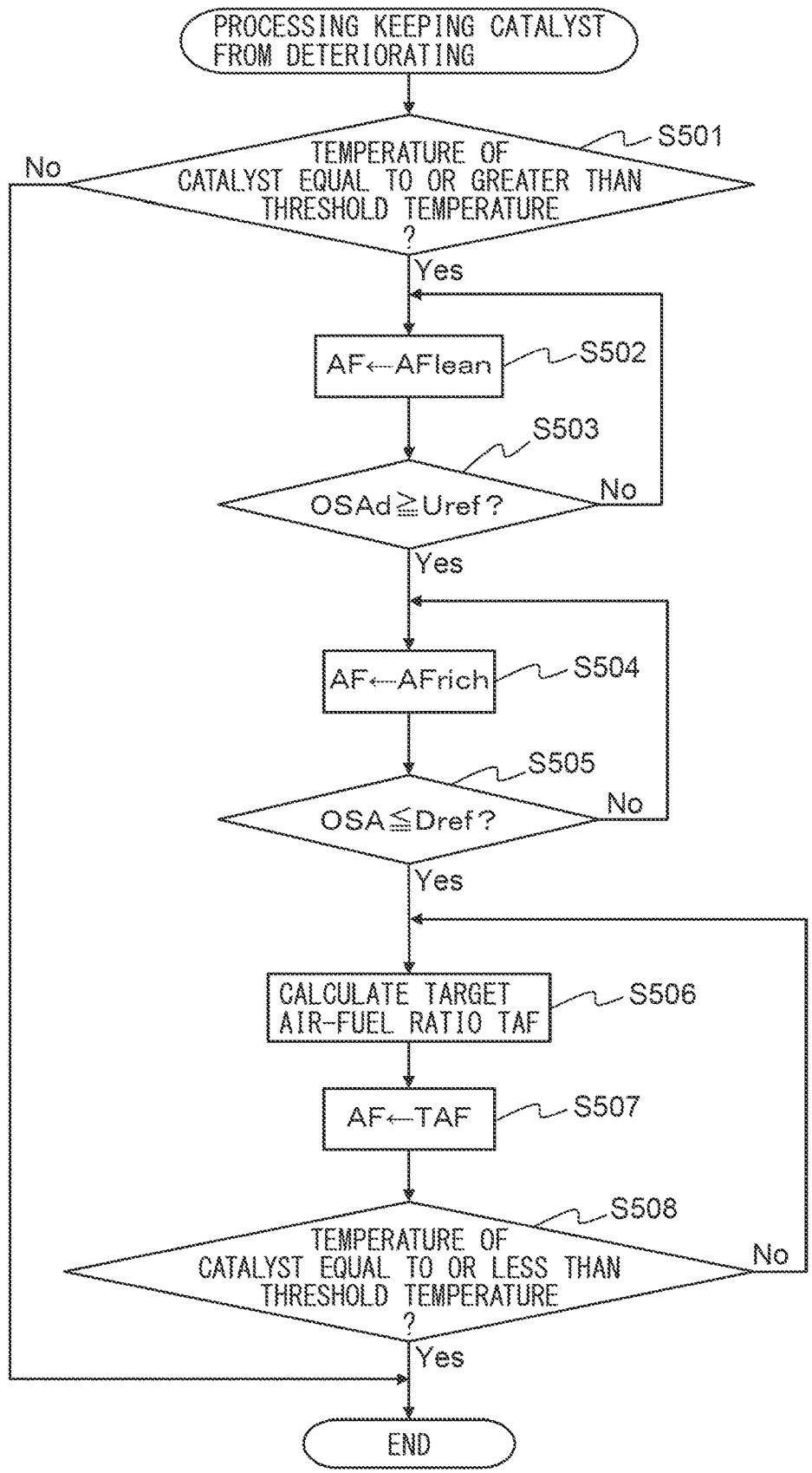
FIG. 16 is a flow chart showing a control routine of processing for keeping a catalyst from deteriorating in the fifth embodiment.

FIG. 16 is a flow chart showing a control routine of processing for keeping the catalyst from deteriorating in the fifth embodiment. The control routine is repeatedly performed by the ECU 31 at predetermined time intervals.

First, at step S501, in the same way as step S401 of FIG. 14, the air-fuel ratio control device judges whether the temperature of the catalyst 20 is equal to or greater than the threshold temperature. If it is judged that the temperature of the catalyst 20 is less than the threshold temperature, the control routine ends. On the other hand, if it is judged that the temperature of the catalyst 20 is equal to or greater than the threshold temperature, the control routine proceeds to step S502.

At step S502, the air-fuel ratio control device makes the air-fuel ratio of the inflowing exhaust gas leaner than the stoichiometric air-fuel ratio. Specifically, the air-fuel ratio control device sets the air-fuel ratio of the target air-fuel ratio of the inflowing exhaust gas to a lean set air-fuel ratio AFlean.

Next, at step S503, the air-fuel ratio control device judges whether the oxygen storage amount OSAd of the HC purification device 23 is equal to or greater than the upper side reference amount Uref. For example, the air-fuel ratio control device, in the same way as step S203 of FIG. 8, cumulatively adds the oxygen excess/deficiency with respect to the stoichiometric air-fuel ratio of the exhaust gas flowing into the HC purification device 23 to thereby calculate the oxygen storage amount OSAd of the HC purification device 23.

If at step S503 it is judged that the oxygen storage amount OSAd of the HC purification device 23 is smaller than the upper side reference amount Dref, the control routine returns to step S502 where the target air-fuel ratio of the inflowing exhaust gas is maintained at the lean set air-fuel ratio AFlean. On the other hand, if at step S503 it is judged that the oxygen storage amount OSAd of the HC purification device 23 is equal to or greater than the upper side reference amount Uref, the control routine proceeds to step S504.

Step S504 to step S508 are performed in the same way as step S402 to step S406 of FIG. 14. After step S508, the control routine ends.

Note that, the HC purification device 23 may be an HC adsorbing material adsorbing HC. In this case, step S502 and step S503 are omitted. Further, HC purification device 23 may be a combination of an HC adsorbing material and a three-way catalyst.

Sixth Embodiment

The exhaust purification system according to a sixth embodiment, with the exception of the points explained below, is basically the same as the exhaust purification system according to the fifth embodiment in configuration and control. For this reason, below, the sixth embodiment of the present invention will be explained centered on parts different from the fifth embodiment.

Figure 17:
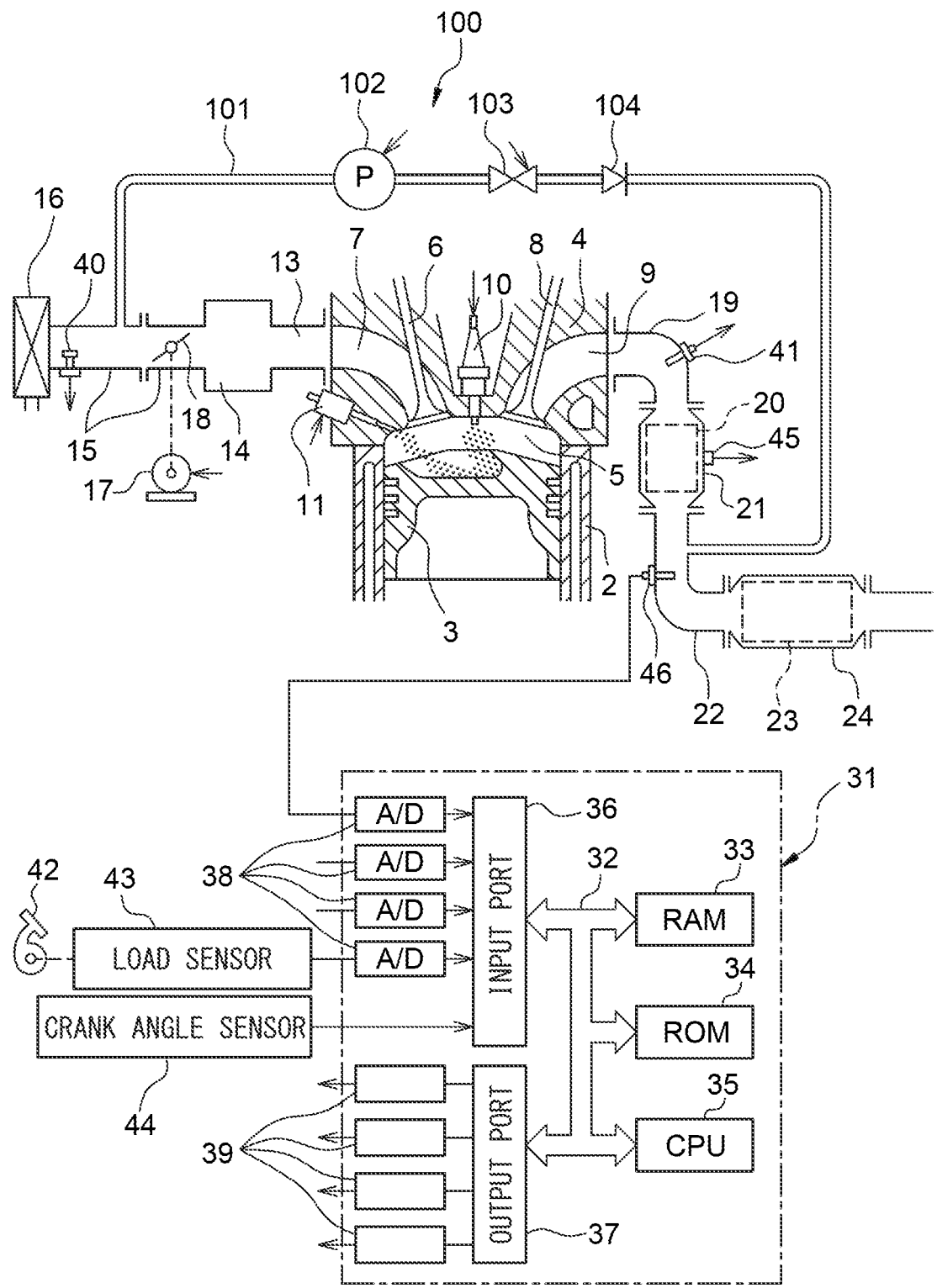
FIG. 17 is a view schematically showing an internal combustion engine in which an exhaust purification system of an internal combustion engine according to a sixth embodiment of the present invention is provided.

FIG. 17 is a view schematically showing an internal combustion engine in which the exhaust purification system of an internal combustion engine according to the sixth embodiment of the present invention is provided. In the sixth embodiment, the exhaust purification system is provided with a catalyst (upstream side catalyst) 20, an air-fuel ratio sensor (upstream side air-fuel ratio sensor) 41, a temperature sensor 45, an air-fuel ratio control device, a HC purification device 23, a downstream side air-fuel ratio sensor 46, and an air supply device 100.

The air-supply device 100 includes an air supply passage 101, an air pump 102, an air switching valve 103, and a check valve 104. The air pump 102, the air switching valve 103, and the check valve 104 are arranged in the air supply passage 101.

The air supply passage 101 connects the intake passage at the upstream side of the throttle valve 18 in the direction of intake flow and the exhaust passage between the catalyst 20 and HC purification device 23. The air pump 102 is driven by an electric motor and pressurizes the air inside the intake passage to supply it to the exhaust passage. The air switching valve 103 opens and closes the air supply passage 101. The check valve 104 prevents air from flowing back from the exhaust passage to the intake passage.

The air pump 102 and the air switching valve 103 are electrically connected to the ECU 31 and are controlled by the ECU 31. When air is supplied to the exhaust passage by the air supply device 100, the air switching valve 103 is opened and the air pump 102 is driven. As a result, a part of the air passing through the air cleaner 16 passes through the air supply passage 101 to be supplied to the exhaust passage. Therefore, the air supply device 100 supplies air to the exhaust passage between the catalyst 20 and the HC purification device 23. Note that, the source of supply of air may be other than the intake passage.

Further, the air supply passage 101 is arranged in the exhaust passage at the upstream side from the downstream side air-fuel ratio sensor 46 in the direction of exhaust flow. For this reason, the downstream side air-fuel ratio sensor 46 can detect the air-fuel ratio of the exhaust gas to which air supplied from the air supply device 100 is added.

In the sixth embodiment, the air-fuel ratio control device controls the air supply device 100. If the temperature of the catalyst 20 is equal to or greater than the threshold temperature, it uses the air supply device 100 to supply air and thereby make the HC purification device 23 an oxidizing atmosphere. For example, if the temperature of the catalyst 20 is equal to or greater than the threshold temperature, the air-fuel ratio control device supplies air to the air supply device 100 so that the oxygen storage amount of the HC purification device 23 becomes equal to or greater than the upper side reference amount. In this case, it is not necessary to make the oxygen storage amount of the catalyst 20 the maximum oxygen storage amount in order to make the HC purification device 23 an oxidizing atmosphere. For this reason, it is possible to make the HC purification device 23 an oxidizing atmosphere.

Processing for Keeping Catalyst From Deteriorating

Figure 18:
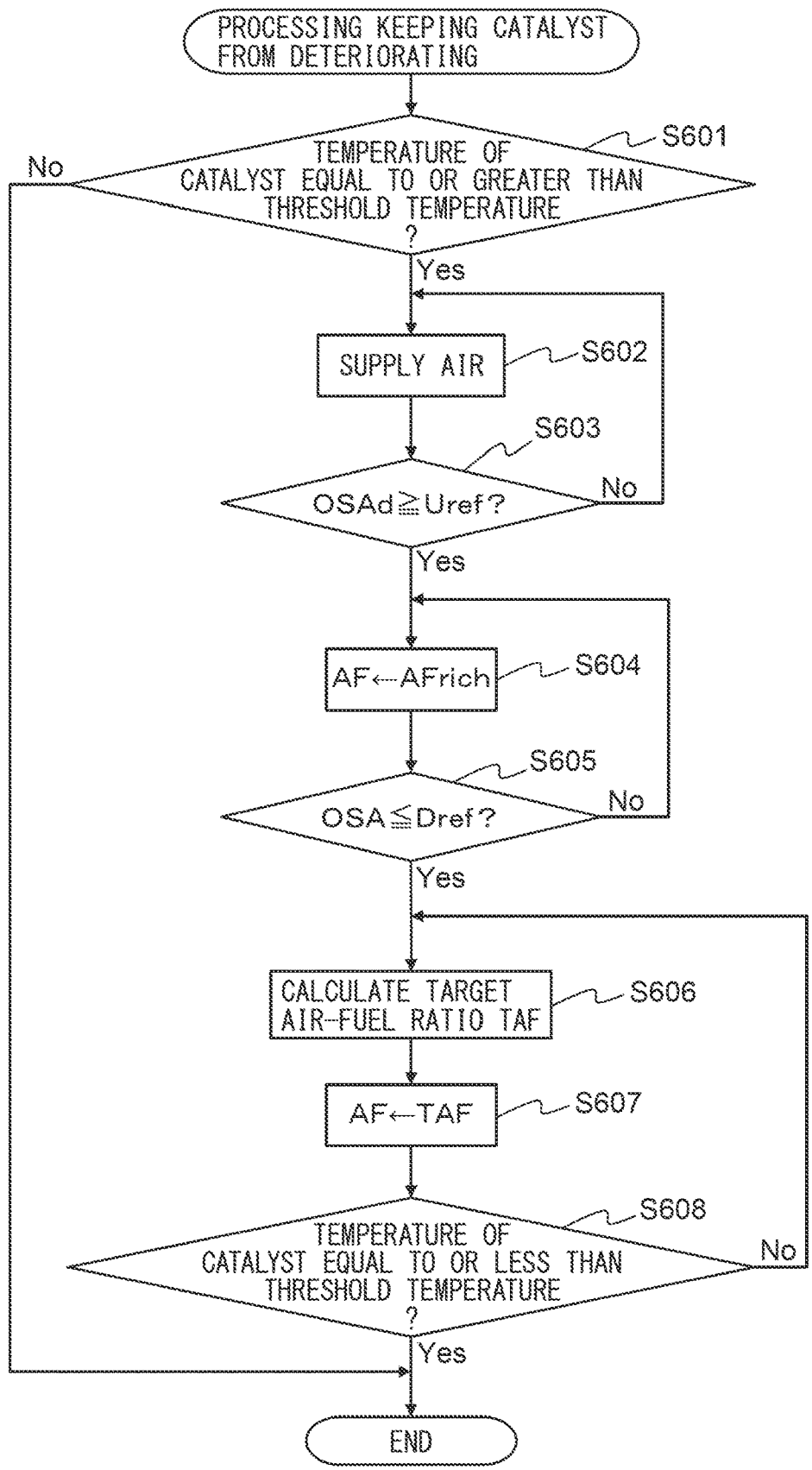
FIG. 18 is a flow chart showing a control routine of processing for keeping a catalyst from deteriorating in the sixth embodiment.

FIG. 18 is a flow chart showing a control routine of processing for keeping the catalyst from deteriorating in the sixth embodiment. The control routine is repeatedly performed by the ECU 31 at predetermined time intervals.

First, at step S601, in the same way as step S501 of FIG. 16, the air-fuel ratio control device judges whether the temperature of the catalyst 20 is equal to or greater than the threshold temperature. If it is judged that the temperature of the catalyst 20 is less than the threshold temperature, the control routine ends. On the other hand, if it is judged that the temperature of the catalyst 20 is equal to or greater than the threshold temperature, the control routine proceeds to step S602.

At step S602, the air-fuel ratio control device uses the air supply device 100 to supply air. As a result, the exhaust gas including air, that is, exhaust gas with an air-fuel ratio leaner than the stoichiometric air-fuel ratio, flows into the HC purification device 23.

Next, at step S603, in the same way as step S503 of FIG. 16, the air-fuel ratio control device judges whether the oxygen storage amount OSAd of the HC purification device 23 is equal to or greater than the upper side reference amount Uref. If at step S603 it is judged that the oxygen storage amount OSAd of the HC purification device 23 is smaller than the upper side reference amount Uref, the control routine returns to step S602 where air continues to be supplied. On the other hand, if at step S603 it is judged that the oxygen storage amount OSAd of the HC purification device 23 is equal to or greater than the upper side reference amount Uref, the control routine proceeds to step S604.

Step S604 to step S608 are performed in the same way as step S504 to step S508 of FIG. 16. After step S608, the control routine ends.

Note that, step S604 and step S605 may be performed in parallel with step S602 and step S603.

Further, the HC purification device 23 may be an HC adsorbing material adsorbing HC. In this case, step S602 and step S603 are omitted. Further, the HC purification device 23 may be a combination of an HC adsorbing material and a three-way catalyst.

Seventh Embodiment

The exhaust purification system according to a seventh embodiment, with the exception of the points explained below, is basically the same as the exhaust purification system according to the first embodiment in configuration and control. For this reason, below, the seventh embodiment of the present invention will be explained centered on parts different from the first embodiment.

Figure 19:
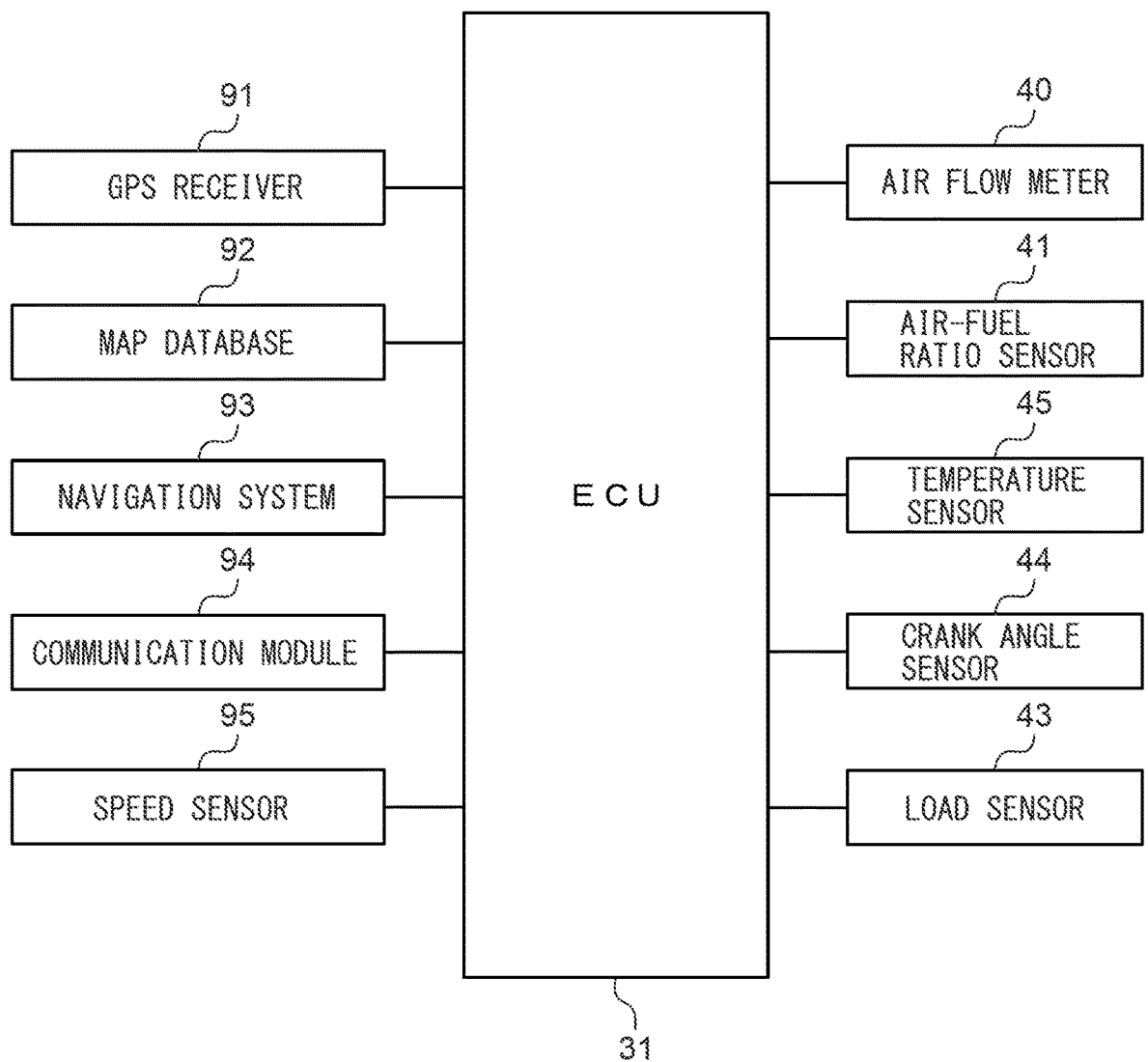
FIG. 19 is a view schematically showing the configuration of a vehicle in which an exhaust purification system of an internal combustion engine according to a seventh embodiment of the present invention is provided.

FIG. 19 is a view schematically showing the configuration of a vehicle in which the exhaust purification system of an internal combustion engine according to the seventh embodiment of the present invention is provided. The vehicle is provided with a GPS receiver 91, a map database 92, a navigation system 93, a communication module 94, and a speed sensor 95.

The GPS receiver 91 receives signals from three or more GPS satellites and detects the current position of the vehicle (for example, the latitude and longitude of the vehicle). The GPS receiver 91 is connected to the ECU 31 through an internal network. The output of the GPS receiver 91 is sent to the ECU 31.

The map database 92 stores map information. The map information includes position information of the road, shape information of the road (for example, whether curve or straight part, radius of curvature of curve, road grade, etc.), road type, speed limit, and other road information. The map database 92 is connected to the ECU 31 through an internal network. The ECU 31 acquires map information from the map database 92.

The navigation system 93 sets the driving route of the vehicle up to the destination based on the current position of the vehicle detected by the GPS receiver 91, map information of the map database 92, input by the driver of the vehicle, etc. The navigation system 93 is connected to the ECU 31 through an internal network. The driving route set by the navigation system 93 is transmitted to the ECU 31. Note that, the GPS receiver 91 and map database 92 may be built into the navigation system 93.

The communication module 94 is an equipment enabling the vehicle and the outside of the vehicle to communicate. The communication module 94 includes, for example, a data communication module (DCM), a short-distance wireless communication module, etc. The vehicle communicates with a server outside of the vehicle etc., through the data communication module. Further, the vehicle communicates with roadside equipment by road-vehicle communication through a short range wireless module and communicates with other vehicles by vehicle-vehicle communication. The communication module 94 is connected to the ECU 31 through an internal network. The information received by the communication module 94 is sent to the ECU 31.

The speed sensor 95 detects the speed of the vehicle. The speed sensor 95 is connected through an internal network to the ECU 31. The output of the speed sensor 95 is transmitted to the ECU 31.

Further, the outputs of the air flow meter 40, the air-fuel ratio sensor 41, the temperature sensor 45, the crank angle sensor 44, and the load sensor 43 are input into the ECU 31.

As explained above, if the catalyst 20 has Pd as the precious metal, by making the catalyst 20 an oxidizing atmosphere before the temperature of the catalyst 20 becomes higher, it is possible to efficiently keep the catalyst 20 from deteriorating. For this reason, if the rise of temperature of the catalyst 20 can be predicted, it is preferable to make the catalyst 20 an oxygen atmosphere when a rise of temperature of the catalyst 20 is predicted. By doing this, even if the temperature of the catalyst 20 rapidly rises, the catalyst 20 can be reliably kept from deteriorating.

For this reason, in the present embodiment, the air-fuel ratio control device makes the catalyst 20 an oxygen atmosphere if a rise of temperature of the catalyst 20 is predicted. For example, when predicting a rise of temperature of the catalyst 20, the air-fuel ratio control device makes the air-fuel ratio of the inflowing exhaust gas leaner than the stoichiometric air-fuel ratio so that the oxygen storage amount of the catalyst 20 becomes equal to or greater than an upper side reference amount.

Processing for Keeping Catalyst From Deteriorating

Figure 20:
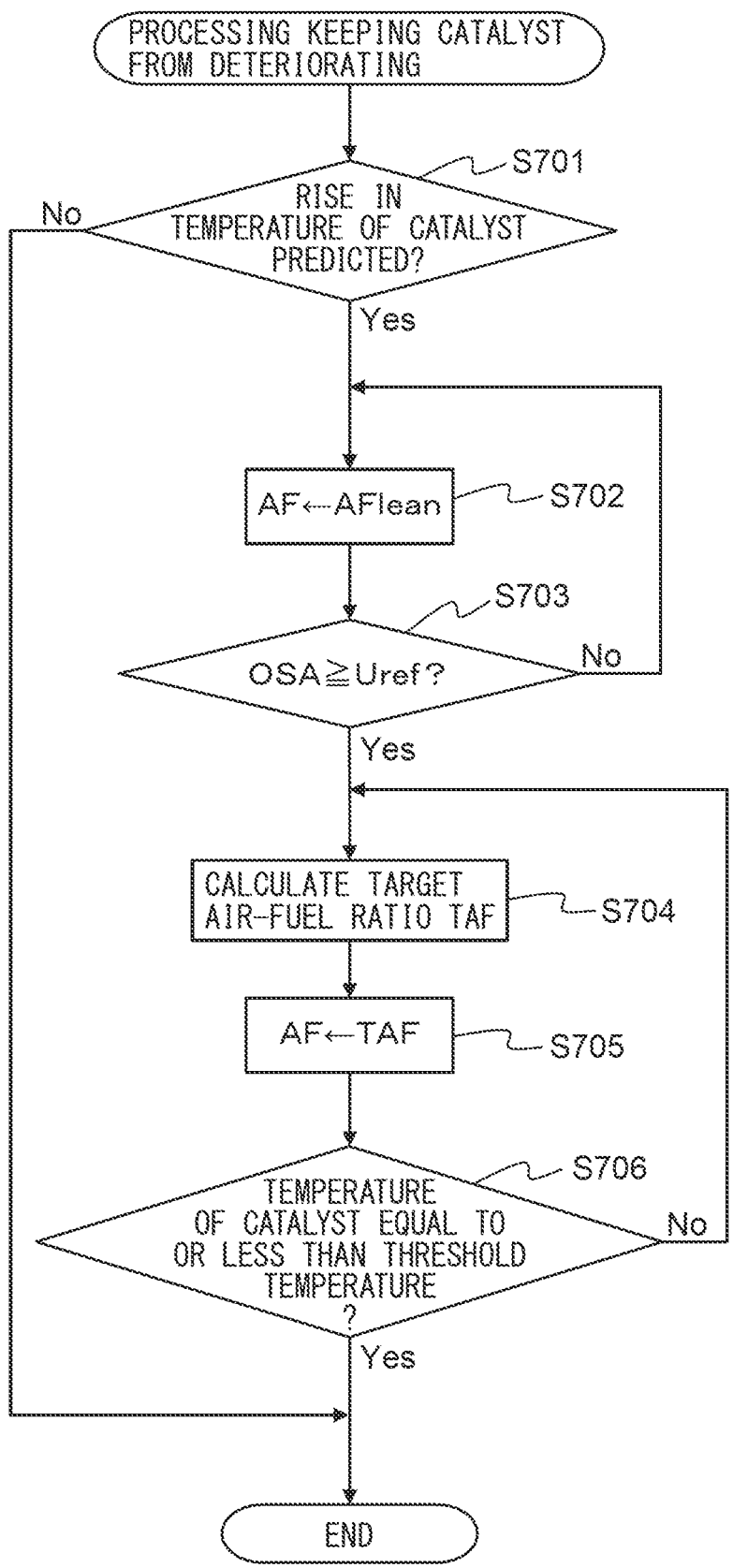
FIG. 20 is a flow chart showing a control routine of processing for keeping a catalyst from deteriorating in the seventh embodiment.

FIG. 20 is a flow chart showing a control routine of processing for keeping the catalyst from deteriorating in the seventh embodiment. The control routine is repeatedly performed by the ECU 31 at predetermined time intervals.

First, at step S701, the air-fuel ratio control device judges whether a rise of temperature of the catalyst 20 is predicted based on the output of the GPS receiver 91, map information stored in a map database 92, a driving route set by the navigation system 93, information received by the communication module 94, output of the speed sensor 95, etc.

For example, if the driving route set by the navigation system 93 includes a section where the load demanded from the internal combustion engine becomes higher (for example, an uphill road etc.), a rise of temperature of the catalyst 20 is predicted in the section before that section. Further, even if the driving route is not set by the navigation system 93, it is possible to predict a rise of temperature of the catalyst 20 based on the speed of a preceding vehicle, an amount of traffic or grade of nearby roads, etc.

Further, if the amount of depression of the accelerator pedal 42 is equal to or greater than a predetermined value, that is, if the output of the load sensor 43 is equal to or greater than a predetermined value, a rise in temperature of the catalyst 20 is predicted. Further, when control is performed for making the vehicle speed a certain target speed (so-called "cruise control"), if the value of the target speed minus the current speed is equal to or greater than a predetermined value, a rise in temperature of the catalyst 20 is predicted.

If at step S701 it is judged that a rise in temperature of the catalyst 20 is not predicted, the control routine ends. On the other hand, if at step S701 it is judged that a rise in temperature of the catalyst 20 is predicted, the control routine proceeds to step S702.

Step S702 to step S706 are performed in the same way as step S102 to step S106 of FIG. 5. After step S706, the control routine ends.

Above, preferred embodiments according to the present invention were explained, but the present invention is not limited to these embodiments and can be corrected and changed in various ways within the language of the claims. For example, the precious metal of the catalyst 20 may be another type of precious metal as long as having the property of the vapor pressure at a predetermined temperature becoming lower in a second atmosphere of a reducing atmosphere or an oxidizing atmosphere compared with a first atmosphere of an oxidizing atmosphere or a reducing atmosphere.

Further, the exhaust purification system may be provided with the air supply device 100 supplying air to the exhaust passage at the upstream side from the catalyst 20. The air-fuel ratio control device may supply air by the air supply device 100 to thereby make the air-fuel ratio of the inflowing exhaust gas leaner than the stoichiometric air-fuel ratio. Further, the exhaust purification system may be provided with the fuel addition valve 47 supplying fuel to the exhaust passage at the upstream side from the catalyst 20. The air-fuel ratio control device may supply fuel by the fuel addition valve 47 to thereby make the air-fuel ratio of the inflowing exhaust gas richer than the stoichiometric air-fuel ratio.

Further, the above-mentioned embodiments can be worked combined in any way. For example, when the seventh embodiment is combined with the second embodiment to the sixth embodiment, at step S201 of FIG. 8, step S301 of FIG. 10, step S401 of FIG. 14, step S501 of FIG. 16, and step S601 of FIG. 18, in the same way as step S701 of FIG. 20, the air-fuel ratio control device judges whether a rise of temperature of the catalyst 20 is predicted.

REFERENCE SIGNS LIST 20 catalyst
31 ECU

The invention claimed is:

1. An exhaust purification system of an internal combustion engine comprising:
   a catalyst arranged in an exhaust passage and able to store oxygen; and
   an air-fuel ratio control device configured to control an air-fuel ratio of inflowing exhaust gas flowing into the catalyst, wherein
   the catalyst has a precious metal and the precious metal has a property of a vapor pressure at a predetermined temperature becoming lower when oxidized, and
   if a temperature of the catalyst is equal to or greater than a threshold temperature or if there is a predicted rise in temperature of the catalyst, the air-fuel ratio control device is configured to make the air-fuel ratio of the inflowing exhaust gas leaner than a stoichiometric air-fuel ratio so that an oxygen storage amount of the catalyst becomes equal to or greater than an upper side reference amount,
   wherein the threshold temperature is set to a temperature at which the vapor pressure of the precious metal does not rise when local heat generation of the catalyst occurs due to a supply of oxygen.

2. The exhaust purification system of the internal combustion engine according to claim 1, further comprising an $NO_X$ purification device arranged in the exhaust passage at a downstream side of the catalyst in a direction of exhaust flow and able to remove $NO_X$ flowing out from the catalyst.

3. The exhaust purification system of the internal combustion engine according to claim 2, wherein
   the $NO_X$ purification device can store oxygen, and
   if the temperature of the catalyst is equal to or greater than the threshold temperature or if there is a predicted rise in temperature of the catalyst, the air-fuel ratio control device is configured to make the air-fuel ratio of the inflowing exhaust gas richer than the stoichiometric air-fuel ratio so that an oxygen storage amount of the $NO_X$ purification device becomes equal to or less than a lower side reference amount less than tyre upper side reference amount, and then the control device is configured to make the air-fuel ratio of the inflowing exhaust gas leaner than the stoichiometric air-fuel ratio so that the oxygen storage amount of the catalyst becomes equal to or greater than the upper side reference amount.

4. The exhaust purification system of the internal combustion engine according to claim 2, further comprising a fuel addition valve supplying fuel to the exhaust passage between the catalyst and the $NO_X$ purification device, wherein the $NO_X$ purification device can store oxygen, and the air-fuel ratio control device is configured to control the fuel addition valve, and if the temperature of the catalyst is equal to or greater than the threshold temperature or if there is a predicted rise in temperature of the catalyst, and the control device is configured supply fuel by the fuel addition valve so that an oxygen storage amount of the $NO_X$ purification device becomes equal to or less than a lower side reference amount less than the upper side reference amount.

5. An exhaust purification system of an internal combustion engine comprising:

a catalyst arranged in an exhaust passage and able to store oxygen; and an air-fuel ratio control device configured to control an air-fuel ratio of inflowing exhaust gas flowing into the catalyst, wherein the catalyst has a precious metal and the precious metal has a property of a vapor pressure at a predetermined temperature becoming higher when oxidized, and if a temperature of the catalyst is equal to or greater than a threshold temperature or if there is a predicted rise in temperature of the catalyst, the air-fuel ratio control device is configured to make the air-fuel ratio of the inflowing exhaust gas richer than a stoichiometric air-fuel ratio so that an oxygen storage amount of the catalyst becomes equal to or less than a lower side reference amount, wherein the threshold temperature is set to a temperature at which the vapor pressure of the precious metal does not rise when local heat generation of the catalyst occurs due to supply of oxygen.

6. The exhaust purification system of the internal combustion engine according to claim 5, further comprising an HC purification device arranged in the exhaust passage at a downstream side of the catalyst in a direction of exhaust flow and able to remove HC flowing out from the catalyst.

7. The exhaust purification system of the internal combustion engine according to claim 6, wherein the HC purification device can store oxygen, and if the temperature of the catalyst is equal to or greater than the threshold temperature or if there is a predicted rise in temperature of the catalyst, the air-fuel ratio control device is configured to make the air-fuel ratio of the inflowing exhaust gas leaner than the stoichiometric air-fuel ratio so that an oxygen storage amount of the HC purification device becomes equal to or greater than an upper side reference amount greater than the lower side reference amount, and then the control device is configured tai make the air-fuel ratio of the inflowing exhaust gas richer than the stoichiometric air-fuel ratio so that the oxygen storage amount of the catalyst becomes equal to or less than the lower side reference amount.

8. The exhaust purification system of the internal combustion engine according to claim 6, further comprising an air supply device supplying air to the exhaust passage between the catalyst and the HC purification device, wherein the HC purification device can store oxygen, and the air-fuel ratio control device is configured to control the air supply device, and if the temperature of the catalyst is equal to or greater than the threshold temperature or if there is a predicted rise in temperature of the catalyst, and the control device is configured to supply air by the air supply device so that an oxygen storage amount of the HC purification device becomes equal to or greater than an upper side reference amount greater than the lower side reference amount.

9. An exhaust purification system of an internal combustion engine comprising:

a catalyst arranged in an exhaust passage and able to store oxygen; and an air-fuel ratio control device configured to control an atmosphere of the catalyst, wherein the catalyst has a precious metal and the precious metal has a property of a vapor pressure at a predetermined temperature becoming lower in a second atmosphere of an oxidizing atmosphere compared with a first atmosphere of a reducing atmosphere, and if a temperature of the catalyst is equal to or greater than a threshold temperature or if there is a predicted rise in temperature of the catalyst, the air-fuel ratio control device is configured to make the catalyst the second atmosphere, wherein the threshold temperature is set to a temperature at which the vapor pressure of the precious metal does not rise when local heat generation of the catalyst occurs due to a supply of oxygen.

10. The exhaust purification system of the internal combustion engine according to claim 9, further comprising a downstream side catalyst arranged in the exhaust passage at a downstream side of the catalyst in a direction of exhaust flow and able to store oxygen, and if the temperature of the catalyst is equal to or greater than the threshold temperature or if there is a predicted rise in temperature of the catalyst, the air-fuel ratio control device is configured to make the downstream side catalyst the first atmosphere.

11. An exhaust purification system of an internal combustion engine comprising:

a catalyst arranged in an exhaust passage and able to store oxygen; and an electronic control unit configured to control an atmosphere of the catalyst, wherein the catalyst has a precious metal and the precious metal has a property of a vapor pressure at a predetermined temperature becoming lower in a second atmosphere of an oxidizing atmosphere compared with a first atmosphere of a reducing atmosphere, and if a temperature of the catalyst is equal to or greater than a threshold temperature or if there is a predicted rise in temperature of the catalyst, the electronic control unit is configured to make the catalyst the second atmosphere, wherein the threshold temperature is set to a temperature at which the vapor pressure of the precious metal does not rise when local heat generation of the catalyst occurs due to a supply of oxygen.

* * * * *